US009998648B2

United States Patent
Ito et al.

(10) Patent No.: US 9,998,648 B2
(45) Date of Patent: Jun. 12, 2018

(54) INFORMATION PROCESSING APPARATUS, INFORMATION PROCESSING METHOD, PHOTOGRAPHING SYSTEM, AND PROGRAM

(71) Applicant: Sony Corporation, Tokyo (JP)

(72) Inventors: Ryogo Ito, Tokyo (JP); Keiji Okamoto, Chiba (JP); Kazuma Akamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 14/913,013

(22) PCT Filed: Nov. 7, 2014

(86) PCT No.: PCT/JP2014/005602
§ 371 (c)(1),
(2) Date: Feb. 19, 2016

(87) PCT Pub. No.: WO2015/072118
PCT Pub. Date: May 21, 2015

(65) Prior Publication Data
US 2016/0212320 A1    Jul. 21, 2016

(30) Foreign Application Priority Data

Nov. 14, 2013   (JP) .................................. 2013-235994

(51) Int. Cl.
*H04N 5/232* (2006.01)
*G08C 17/02* (2006.01)
(Continued)

(52) U.S. Cl.
CPC ......... *H04N 5/23206* (2013.01); *G08C 17/02* (2013.01); *H04N 5/23203* (2013.01);
(Continued)

(58) Field of Classification Search
CPC ............... H04N 5/23206; H04N 5/247; H04N 5/23203; H04N 5/2257; G08C 17/02; G08C 2201/93; G08C 2201/50
See application file for complete search history.

(56) References Cited

U.S. PATENT DOCUMENTS 8,427,544 B2 * 4/2013 Watanabe .............. H04N 5/232
348/211.11
2004/0186593 A1 9/2004 Senoo et al.
(Continued)

FOREIGN PATENT DOCUMENTS

| JP | 10-224772 A | 8/1998 |
| JP | 2011-050017 A | 3/2011 |
| JP | 2013-105119 A | 5/2013 |

OTHER PUBLICATIONS

Japanese Office Action dated Mar. 14, 2017 for corresponding Japanese Application No. 2013-235994.
(Continued)

*Primary Examiner* — Twyler Haskins
*Assistant Examiner* — Angel L Garces-Rivera
(74) *Attorney, Agent, or Firm* — Michael Best & Friedrich LLP

(57) ABSTRACT

An information processing apparatus, information processing method, and program are disclosed. In the information processing apparatus, circuitry is configured to transmit an input command to at least one of a plurality of imaging devices that are associated with the information processing apparatus, the command being executable as a synchronous operation or an asynchronous operation based on information relating to at least one of the imaging devices. The information may, for example, be the number of the imaging devices to which the input command is transmitted. In that example, when the number of the imaging devices is below a threshold amount, the input command is transmitted as the
(Continued)

synchronous operation, and when the number of the imaging devices is above the threshold amount, the input command is transmitted as the asynchronous operation.

22 Claims, 19 Drawing Sheets

(51) Int. Cl.
    *H04N 5/247*     (2006.01)
    *H04N 5/225*     (2006.01)

(52) U.S. Cl.
    CPC ......... *H04N 5/247* (2013.01); *G08C 2201/50* (2013.01); *G08C 2201/93* (2013.01); *H04N 5/2257* (2013.01)

(56) References Cited

U.S. PATENT DOCUMENTS

| | | |
|---|---|---|
| 2011/0050925 A1 | 3/2011 | Watanabe |
| 2013/0121673 A1 | 5/2013 | Natsume |

OTHER PUBLICATIONS

European Patent Office Communication Pursuant to Article 94(3) dated Apr. 5, 2018 for corresponding European Application No. 14805687.2.

\* cited by examiner

FIG. 1
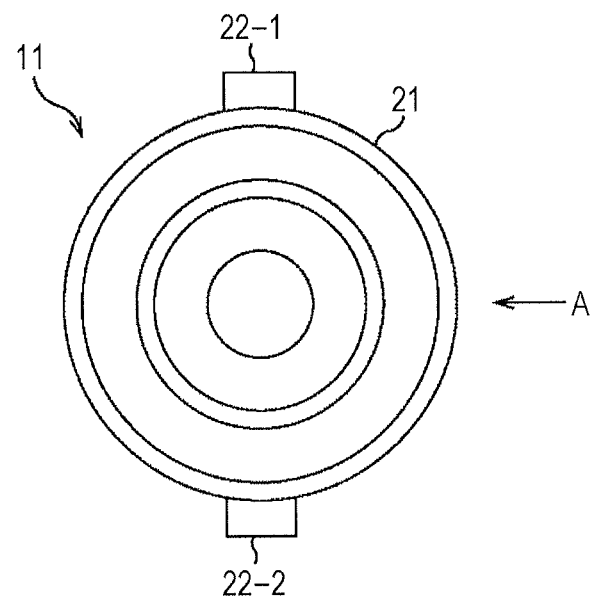
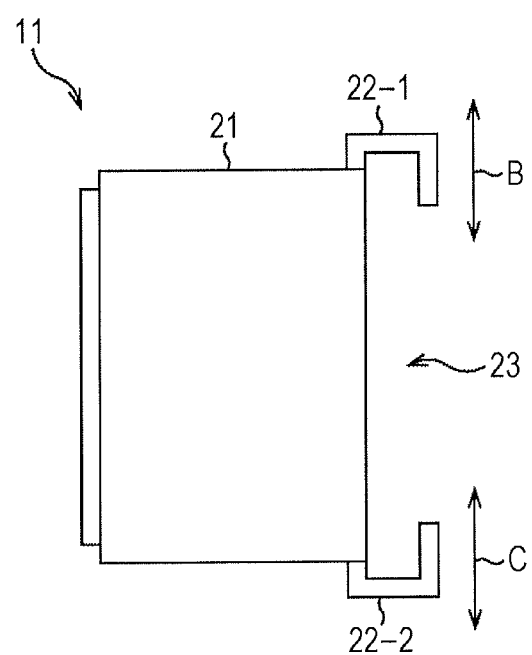

FIG. 2
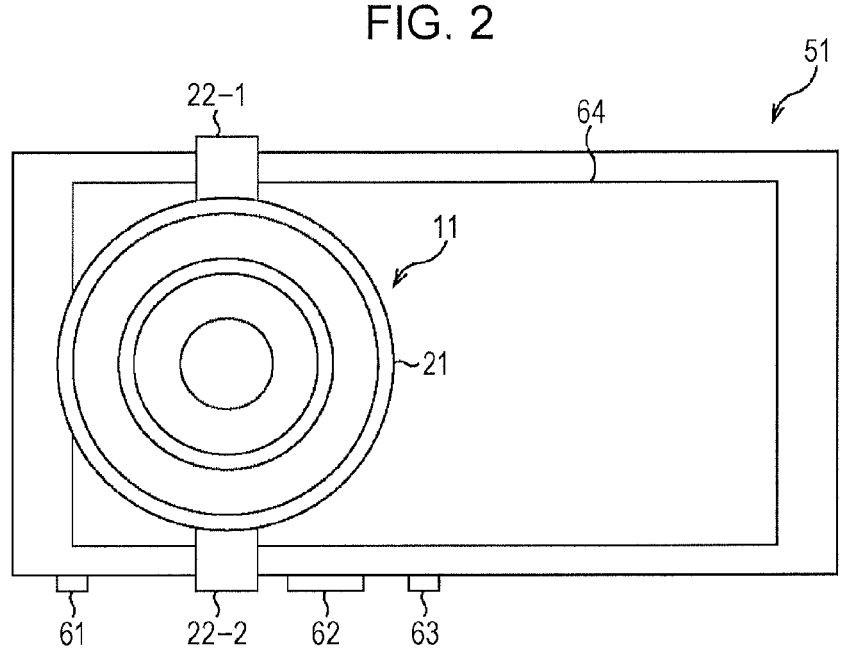
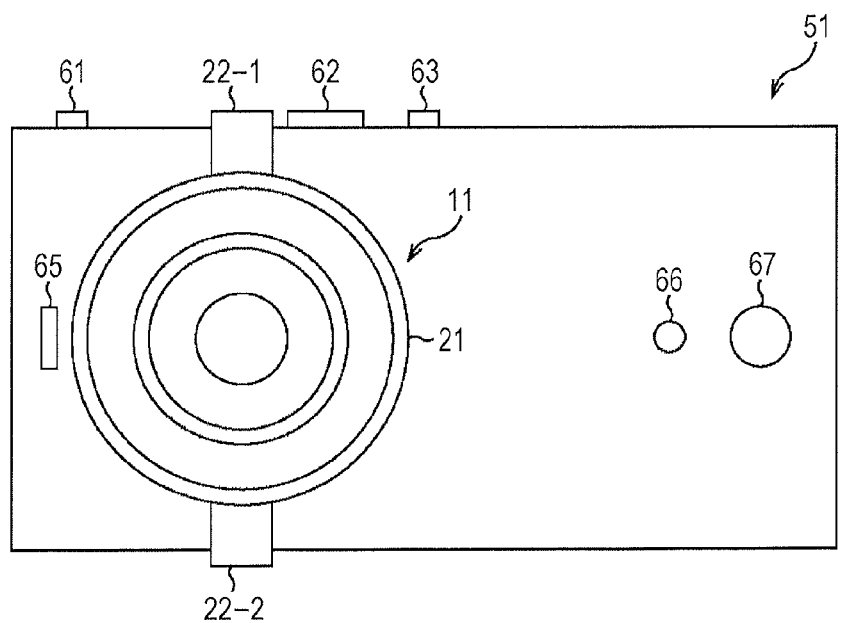

FIG. 5
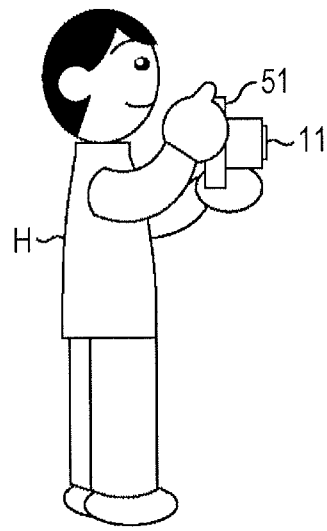
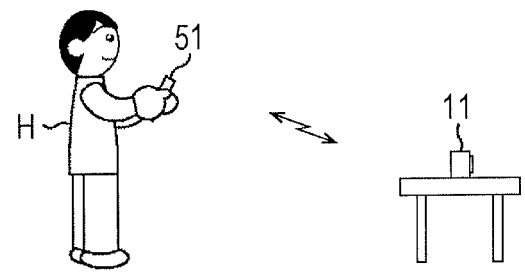
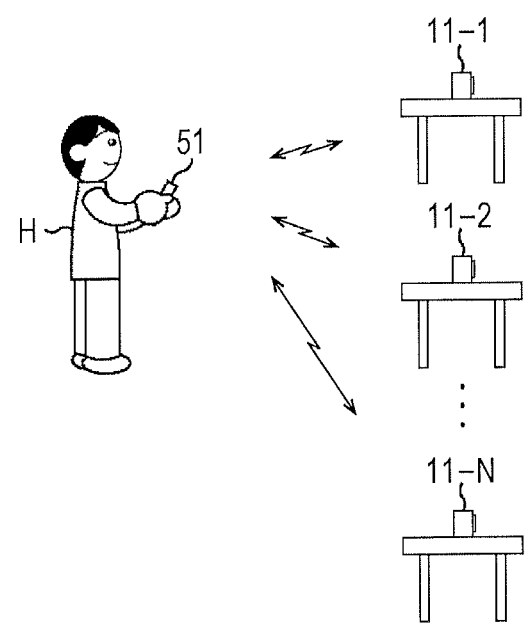

INFORMATION PROCESSING APPARATUS, INFORMATION PROCESSING METHOD, PHOTOGRAPHING SYSTEM, AND PROGRAM

CROSS REFERENCE TO RELATED APPLICATIONS

This application claims the benefit of Japanese Priority Patent Application JP 2013-235994 filed Nov. 14, 2013, the entire contents of which are incorporated herein by reference.

TECHNICAL FIELD

The present disclosure relates to an information processing apparatus, an information processing method, a photographing system, and a program, and more particularly, relates to an information processing apparatus, an information processing method, a photographing system, and a program, in which reliability and operability of a remote operation can be adjusted to be well-balanced.

BACKGROUND ART

In recent years, a technology has been developed, in which a predetermined command is transmitted to a photographing apparatus provided at a position apart from the user, and photographing is performed by a remote operation, as a user operates an operation terminal.

In this case, the photographing apparatus receives an operation signal corresponding to the command transmitted from the operation terminal, and transmits a photographed image or the like which is an operation result to the operation terminal after being operated corresponding to the operation signal.

However, in a case where a photographing direction is changed according to the operation signal corresponding to the command which is supplied to the photographing apparatus from an operation terminal for changing the photographing direction, after the operation signal is transmitted to the photographing apparatus and the photographing direction is changed and photographing is performed, a time lag exists and the operability is low until the photographed image is received.

Here, in the operation terminal, an image which is already maintained is edited and displayed according to the operation signal that corresponds to the operation command, and the image after changing the photographing direction according to the operation signal is received and displayed. Accordingly, a technology is suggested in which the apparent time lag is reduced and the operability is improved (refer to PTL 1).

CITATION LIST

Patent Literature

[PTL 1]
Japanese Unexamined Patent Application Publication No. 10-224772

SUMMARY

Technical Problem

However, in the above-described technology, when a plurality of photographing apparatuses is remotely operated by one operation terminal, there is a possibility that a communication abnormality is likely to occur on a transmission path between the plurality of photographing apparatuses and the operation terminal and reliability or operability is lost due to a reaction delay caused by the communication abnormality.

The disclosure considers this situation, and particularly, appropriately adjusts the reliability and the operability by appropriately using a command for operating the plurality of photographing apparatuses by one operation terminal by dividing into a synchronous operation command which receives a completion notification from each photographing apparatus and an asynchronous communication command which only transmits the command and does not receive a completion notification.

Solution to Problem

According to one aspect of the present disclosure, an information processing apparatus comprises circuitry configured to transmit an input command to at least one of a plurality of imaging devices that are associated with the information processing apparatus, the command being executable as a synchronous operation or an asynchronous operation based on information relating to at least one of the imaging devices.

The information processing apparatus may be provided wherein the related information is a number of the imaging devices to which the input command is transmitted.

The information processing apparatus may be further provided such that when the number of the imaging devices is below a threshold amount, the input command is transmitted as the synchronous operation, and when the number of the imaging devices is above the threshold amount, the input command is transmitted as the asynchronous operation.

The information processing apparatus may be further provided such that the information is a hop count for a wireless network communication with said at least one of the imaging devices to which the input command is transmitted.

The information processing apparatus may be further provided such that, wherein the information processing apparatus has an apparatus type, and the information is the apparatus type transmitting the input command to said at least one of the imaging devices.

The information processing apparatus may be further provided such that the information is an operation mode of said at least one of the imaging devices to which the input command is transmitted.

The information processing apparatus may be further provided such that when the operation mode is any of a high dynamic range mode, a super high-sensitivity mode, and a continuous imaging mode, the input command is transmitted as the asynchronous operation.

The information processing apparatus may be further provided such that the information is an amount of processing time expected to execute the input command.

The information processing apparatus may be further provided such that the information is dependent upon a characteristic of a network wherein the information processing apparatus is wirelessly associated with the imaging devices.

The information processing apparatus may be further provided such that the characteristic comprises a number of the imaging devices wirelessly associated with the information processing apparatus, a hop count corresponding to at least one of the imaging devices in the network, and/or an apparatus type of the information processing apparatus.

The information processing apparatus may be further provided such that, for the synchronous operation, when the input command is transmitted to said at least one of the imaging devices, a next input command is not transmitted to said at least one of the imaging devices until a completion notification is received regarding the input command.

The information processing apparatus may be further provided such that for the asynchronous operation, when the input command is transmitted to said at least one of the imaging devices, a next input command is transmitted to said at least one of the imaging devices in the absence of a confirmation that said at least one of the imaging devices has completed the input command.

According to an aspect of the present disclosure, a method for controlling an information processing apparatus is provided, with the method comprising: transmitting an input command to at least one of a plurality of imaging devices that are associated with the information processing apparatus, the command being executable as a synchronous operation or an asynchronous operation based on information relating to at least one of the imaging devices.

According to an aspect of the present disclosure, a non-transitory computer readable medium is provided, which stores program code for controlling an information processing apparatus, the program code being executable by a processor to perform operations comprising: transmitting an input command to at least one of a plurality of imaging devices that are associated with the information processing apparatus, the command being executable as a synchronous operation or an asynchronous operation based on information relating to at least one of the imaging devices.

The computer readable medium may be provided such that the information is a number of the imaging devices to which the input command is transmitted.

According to an aspect of the present disclosure, an information processing apparatus comprises: circuitry configured to transmit a first command to at least one of a plurality of imaging devices, transmit a second command to at least one of the plurality of imaging devices after receiving a command response from the imaging device to which the first command is transmitted when the number of the plurality of imaging devices is smaller than a first value, and transmit the second command to at least one of the plurality of imaging devices regardless of receiving any command response from the imaging device to which the first command is transmitted when the number of the plurality of imaging devices is greater than the first value.

The information processing apparatus may be provided such that the circuitry is configured to transmit the second command to at least one of the plurality of imaging devices in the absence of the command response from the imaging device to which the first command is transmitted when the number of the plurality of imaging devices is greater than the first value.

The information processing apparatus may be provided such that the circuitry is configured to: transmit the second command with an information indicating that the second command is a synchronous command to at least one of the plurality of imaging devices after receiving a command response from the imaging device to which the first command is transmitted when the number of the plurality of imaging devices is smaller than a first value, and transmit the second command with an information indicating that the second command is an asynchronous command to at least one of the plurality of imaging devices regardless of receiving the command response from the imaging device to which the first command is transmitted when the number of the plurality of imaging devices is greater than the first value.

According to an aspect of the present disclosure, an imaging device connected to an information processing device, comprises: circuitry configured to transmit information regarding the imaging device, receive a command from an information processing apparatus, and determine whether to transmit a command response to the information processing apparatus based on whether the command is a synchronous command or an asynchronous command, wherein the command is determined as the synchronous command or the asynchronous command based on the information transmitted by the imaging device.

According to at least one embodiment of the present disclosure, by one operation terminal, reliability and operability can be adjusted to be well-balanced when a plurality of photographing apparatuses are remotely operated.

BRIEF DESCRIPTION OF DRAWINGS

FIG. 1 is a view illustrating an appearance configuration of a photographing apparatus according to a first embodiment of the present disclosure.

FIG. 2 is a view illustrating an appearance configuration when the photographing apparatus is attached to an information processing apparatus according to the first embodiment of the present disclosure.

FIG. 5 is a view illustrating an example of use of the photographing apparatus and the information processing apparatus according to the first embodiment of the present disclosure.

DESCRIPTION OF EMBODIMENTS

Figure 3:
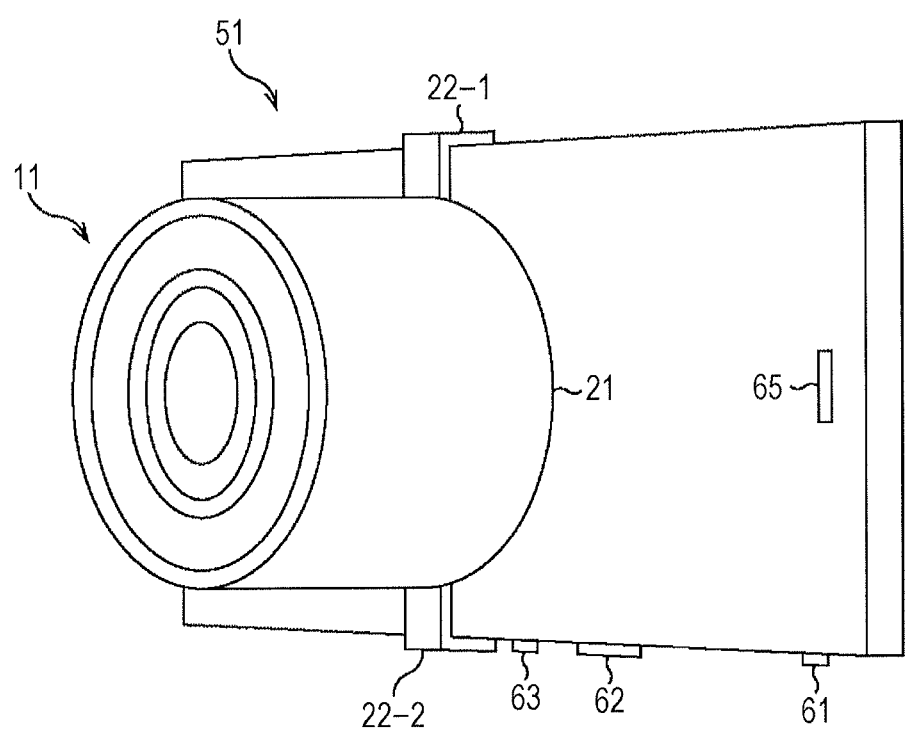
FIG. 3 is a view illustrating the appearance configuration when the photographing apparatus is attached to the information processing apparatus according to the first embodiment of the present disclosure.

Hereinafter, embodiments of the present disclosure (hereinafter, referred to as embodiments) will be described. The description will be given in the following order.

1. First embodiment (an example in which a synchronous operation command and an asynchronous operation command are converted to each other based on the number of photographing apparatuses to be controlled)

2. Second embodiment (an example in which the synchronous operation command and the asynchronous operation command are converted to each other based on an operation mode of the photographing apparatus to be controlled)

3. Third embodiment (an example in which the synchronous operation command and the asynchronous operation command are converted to each other based on a processing time of a command of the photographing apparatus to be controlled)

4. Fourth embodiment (an example in which the synchronous operation command and the asynchronous operation command are converted to each other based on a hop count of the photographing apparatus to be controlled)

5. Fifth embodiment (an example in which the synchronous operation command and the asynchronous operation command are converted to each other based on whether or not the command to the photographing apparatus to be controlled is from a main body)

1. First Embodiment (Example of Appearance Configuration of Photographing Apparatus)

FIG. 1 is a view illustrating an appearance configuration of a photographing apparatus 11 according to a first embodiment of the present disclosure. An upper part of FIG. 1 illustrates a front view of the photographing apparatus 11. A lower part of FIG. 1 illustrates a side view (side view when viewed from an arrow A) of the photographing apparatus 11.

In addition, in the embodiment of the present disclosure, an example, in which the photographing apparatus 11 is a photographing apparatus in a cylindrical shape (column shape), is described. In other words, an example is described in which a shape of the photographing apparatus 11 is a shape which is made by taking out only a lens portion of a general photographing apparatus (for example, an integrated camera). In addition, the photographing apparatus 11 is provided with an operation member, such as a zoom lever or a shutter button, which are not illustrated in FIG. 1 or the like. In addition, the photographing apparatus 11 is realized, for example, by a digital still camera or a digital video camera (for example, a camera-integrated recorder).

The photographing apparatus 11 includes a lens barrel 21 and attaching members 22-1 and 22-2. The lens barrel 21 accommodates each member, such as an optical system or an imaging system.

The attaching members 22-1 and 22-2 are attachments which are used when the photographing apparatus 11 is attached to another apparatus (for example, an information processing apparatus 51 illustrated in FIG. 2). For example, according to a shape and size of another apparatus, by moving the attaching member 22-1 in an arrow B direction and by moving the attaching member 22-2 in an arrow C direction, it is possible to attach the photographing apparatus 11 to the apparatus. In other words, the attaching members 22-1 and 22-2 are attachments for fixing the photographing apparatus 11 to another apparatus. In addition, an attachment surface in a case where the photographing apparatus 11 is mounted in another apparatus is illustrated as a mounting surface 23 (a surface opposite to a surface of a lens side illustrated in the upper part of FIG. 1). In addition, an example of a case where the photographing apparatus 11 is attached to another apparatus is illustrated in FIGS. 2 and 3.

As such, for example, the photographing apparatus 11 can perform general photographing operations, and can be used by mounting to another device (for example, a smartphone). In addition, when used by mounting to another device, the photographing apparatus 11 can be operated by a remote control.

(Attachment Example of Photographing Apparatus)

FIGS. 2 and 3 are views illustrating an appearance configuration when the photographing apparatus 11 is attached to the information processing apparatus 51 according to the first embodiment of the present disclosure.

In an upper part of FIG. 2, an example of a case where the photographing apparatus 11 is attached to one surface (surface provided with an input and output portion 64) of the information processing apparatus 51 is illustrated. In a lower part of FIG. 2, an example of a case where the photographing apparatus 11 is attached to another surface (a surface opposite to a surface provided with the input and output portion 64) of the information processing apparatus 51 is illustrated. In FIG. 3, another example of a case where the photographing apparatus 11 is attached to another surface (a surface opposite to a surface provided with the input and output portion 64) of the information processing apparatus 51 is illustrated.

The information processing apparatus 51 includes operation members 61 to 63, the input and output portion 64, a voice output portion 65, a light-emitting portion 66, and a photographing portion 67. Furthermore, the information processing apparatus 51 is realized by the information processing apparatus, such as a smartphone and a tablet terminal.

The operation members 61 to 63 are operation members which are used when various types of operation input are performed.

The input and output portion 64 displays various images, and receives an operation input from a user based on a detection state of an object which is close to or in contact with a display surface of the input and output portion 64.

The voice output portion 65 includes a speaker or the like, and outputs various types of voice information.

The light-emitting portion 66 is a light-emitting apparatus which emits light to a subject. The light-emitting portion 66 is used when a photographing operation is performed by using the information processing apparatus 51 in an environment in which sufficient brightness is not expected, such as at night time or an indoor environment.

The photographing portion 67 photographs the subject and generates an image (image data).

As illustrated in FIGS. 2 and 3, by interposing a main body of the information processing apparatus 51 by the mounting members 22-1 and 22-2 of the photographing apparatus 11, it is possible to fix the photographing apparatus 11 to the information processing apparatus 51.

(Functional Configuration Example of Photographing Apparatus and Information Processing Apparatus)

Figure 4:
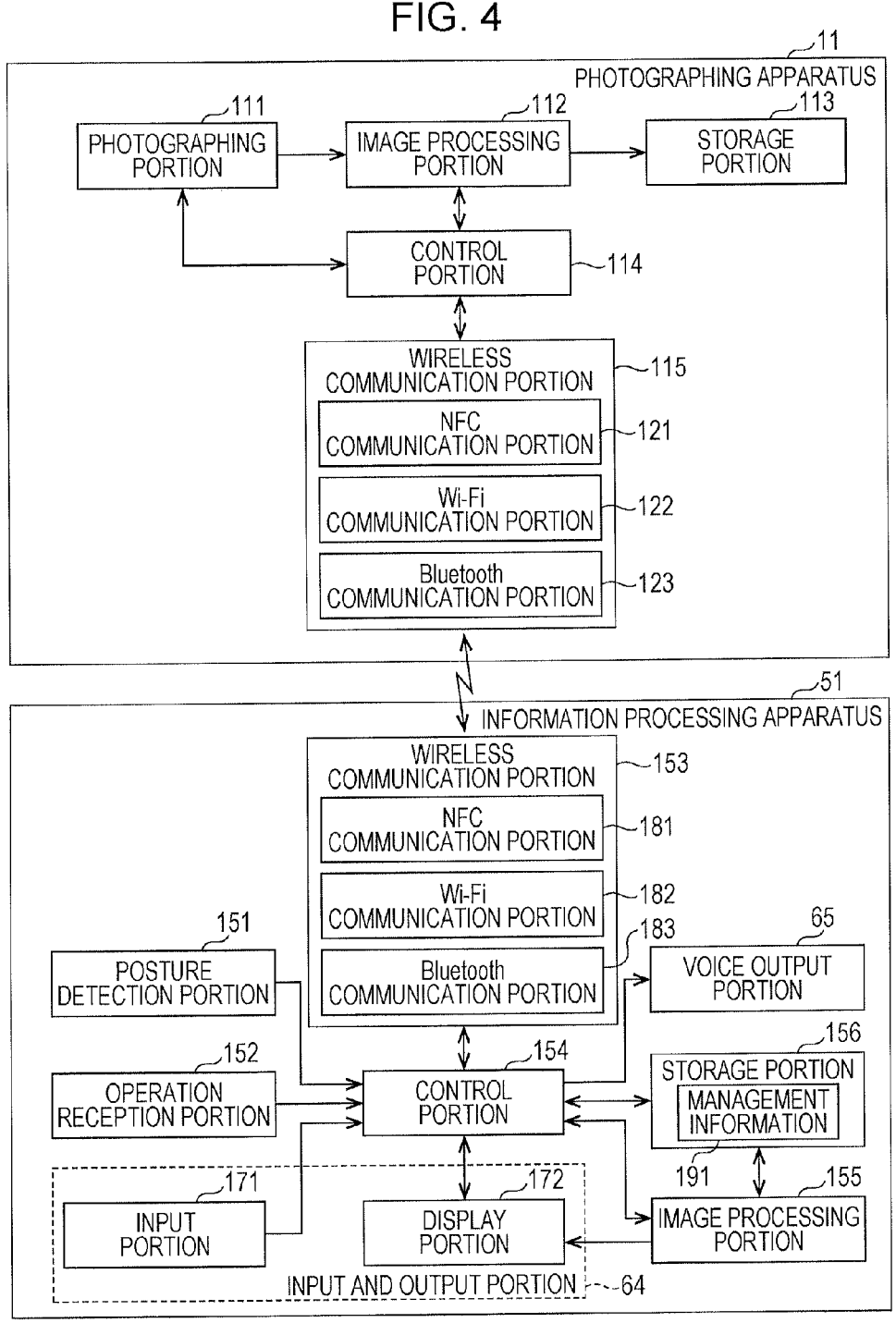
FIG. 4 is a block diagram illustrating a functional configuration example of the photographing apparatus and the information processing apparatus according to the first embodiment of the present disclosure.

FIG. 4 is a block diagram illustrating a functional configuration example of the photographing apparatus 11 and the information processing apparatus 51 according to the first embodiment of the present disclosure. In addition, a photographing system which has the photographing apparatus 11 and the information processing apparatus 51 is configured.

The photographing apparatus 11 includes a photographing portion 111, an image processing portion 112, a storage portion 113, a control portion 114, and a wireless communication portion 115.

The photographing portion 111 photographs the subject, generates the image (image data), and outputs the generated image to the image processing portion 112. The photographing portion 111 is configured to have the optical system (a plurality of lenses) and a photographing element, for example. In addition, the photographing portion 111 controls each part (for example, a zoom lens, a focus lens, and a diaphragm), based on a control of the control portion 114. In addition, in the embodiment of the present disclosure, when an "image" is mentioned, the "image" means both the image itself and the image data for displaying the image.

Based on the control of the control portion 114, the image processing portion 112 conducts predetermined image processing (for example, demosaic processing) with respect to the image output from the photographing portion 111 and stores the image which is image-processed in the storage portion 113. In addition, the image which is image-processed by the image processing portion 112 may be stored in a storage portion 156 by using wireless communication and by transmitting to the information processing apparatus 51.

The storage portion 113 is a storage medium which stores the image which is image-processed by the image processing portion 112 as content (for example, a still picture file and a moving picture file). In addition, the storage portion 113 may be embedded in the photographing apparatus 11, and may be detachable from the photographing apparatus 11.

The control portion 114 controls each part in the photographing apparatus 11 based on a control program. For example, the control portion 114 controls each part based on the operation input received by the operation member (not illustrated), such as the zoom lever or the shutter button, provided in the photographing apparatus 11. In addition, the control portion 114 controls each part based on control information received from the information processing apparatus 51 via the wireless communication portion 115. In other words, it is possible to remotely operate the photographing apparatus 11 by using the information processing apparatus 51.

The wireless communication portion 115 performs transmission and reception of each type of information (for example, control data and the image data) between the apparatus and another information processing apparatus (for example, the information processing apparatus 51), by using wireless communication.

The wireless communication portion 115 has a near field communication (NFC) communication portion 121, a wireless fidelity (Wi-Fi) communication portion 122, and a Bluetooth communication portion 123.

The NFC communication portion 121 is an interface which performs a contactless communication with an outer apparatus (for example, the information processing apparatus 51) which is proximate in cooperation with an NFC communication antenna (not illustrated), according to the control of the control portion 114. The NFC communication portion 121 transmits radio waves which reach a near field to an extent of approximately 3 cm to 10 cm from the NFC antenna, or approximately 7 mm according to a design, and performs NFC communication with the outer apparatus included in a radio wave reaching range.

For example, the NFC communication portion 121 transmits connection information (Wi-Fi configuration) for performing an automatic connection of Wi-Fi or an android application record (AAR), according to a check command from the outer apparatus. The Wi-Fi configuration includes a service set identifier (SSID) for a Wi-Fi connection, a PassKey (encryption key), or the like.

The Wi-Fi communication portion 122 is an interface which performs the wireless communication with the outer apparatus (for example, the information processing apparatus 51) in the vicinity in cooperation with the NFC communication antenna (not illustrated), according to the control of the control portion 114.

For example, the Wi-Fi communication portion 122 performs Wi-Fi certification according to a Wi-Fi connection request from the outer apparatus, and performs Wi-Fi connection establishing processing with the outer apparatus.

The Bluetooth (registered trademark) communication portion 123 transmits and receives each type of information by the wireless communication which is performed at a maximum of 24 Mbps, with a device which has a frequency radius to an extent of 10 m to 100 m by using a frequency channel in a 2.4-Ghz band. Furthermore, in addition to this, the wireless communication portion 115 can use the wireless communication, such as infrared rays or portable radio waves.

The wireless communication portion 115 can use a plurality of wireless communication methods at the same time. For example, when the wireless communication is initiated, only turning on a power source and exchanging data (for example, the service set identifier (SSID)) related to the Wi-Fi, are performed by the NFC communication portion 121. Then, exchanging the data that follows this can be performed by the Wi-Fi communication portion 122.

The information processing apparatus 51 includes a posture detection portion 151, an operation reception portion 152, a wireless communication portion 153, a control portion 154, the image processing portion 155, the storage portion 156, the input and output portion 64, and the voice output portion 65.

The posture detection portion 151 detects a posture change of the information processing apparatus 51 by detecting acceleration, movement, or inclination of the information processing apparatus 51, and outputs posture information related to the detected posture change to the control portion 154. In addition, it is possible to use various sensors, such as a gyro sensor or an acceleration sensor, as the posture detection portion 151.

The operation reception portion 152 is an operation reception portion which receives an operation which is performed by the user, and outputs the control information (operation information) according to the received operation content to the control portion 154. In addition, the operation reception portion 152 corresponds to the operation members 61 to 63 illustrated in FIGS. 2 and 3, for example.

The wireless communication portion 153 performs the transmission and the reception of each type of information (for example, the control data or the image data) between the apparatus and another information processing apparatus (for example, the photographing apparatus 11) by using the wireless communication, based on the control of the control portion 154. The wireless communication portion 153 has an NFC communication portion 181, a Wi-Fi communication portion 182, and a Bluetooth communication portion 183.

The NFC communication portion 181 is an interface which performs the contactless communication with the outer apparatus (for example, the photographing apparatus 11) which is proximate in cooperation with an NFC communication antenna (not illustrated), according to the control of the control portion 154. The NFC communication portion 181 transmits the radio waves which reach the near field to an extent of approximately 3 cm to 10 cm from the NFC antenna, or approximately 7 mm according to the design, and performs the NFC communication with the outer apparatus included in the radio wave reaching range.

For example, the NFC communication portion 181 transmits the connection information (Wi-Fi configuration) for performing the automatic connection of the Wi-Fi or the android application record (AAR), according to the check command from the outer apparatus. The Wi-Fi configuration includes the service set identifier (SSID) for the Wi-Fi connection, the PassKey (encryption key), or the like.

The Wi-Fi communication portion 182 is an interface which performs the wireless communication with the outer apparatus (for example, the photographing apparatus 11) in the vicinity in cooperation with a Wi-Fi communication antenna (not illustrated), according to the control of the control portion 154.

For example, the Wi-Fi communication portion 122 performs the Wi-Fi certification according to the Wi-Fi connection request from the outer apparatus or the apparatus itself, and performs the Wi-Fi connection establishing processing with the outer apparatus.

The Bluetooth (registered trademark) communication portion 183 receives each type of information by the wireless communication which is performed at a maximum of 24 Mbps, with the device which has a frequency radius to an extent of 10 m to 100 m by using the frequency channel in a 2.4-Ghz band. In addition to this, the wireless communication portion 115 can use the wireless communication, such as the infrared rays or the portable radio waves.

The wireless communication portion 153 can use the plurality of wireless communication methods. For example, when the wireless communication is initiated, only turning on the power source and exchanging the data (for example, the service set identifier (SSID)) related to the Wi-Fi, are performed by the NFC communication portion 181. Then, exchanging the data that follows this can be performed by the Wi-Fi communication portion 182.

The input and output portion 64 is configured by integrating an input portion 171 and a display portion 172. In addition, the input and output portion 64 displays various images on the display portion 172 based on the control of the control portion 154 and receives the operation input from the user by the input portion 171 based on the detection state of the object which is close to or in contact with a display surface of the display portion 172. In addition, the input portion 171 outputs the control information to the control portion 154 according to the received operation input.

For example, as the input portion 171, an electrostatic (electrostatic capacity method) touch panel which detects contact or approach of the object (for example, a finger of a person) having conductivity based on a change in electrostatic capacity, can be used. In addition, for example, as the display portion 172, a display panel, such as a liquid crystal display (LCD) or an organic electro luminescence (EL), can be used. The input and output portion 64 is configured by superimposing a transparent touch panel on a display surface of the display panel, for example.

The control portion 154 controls each part in the information processing apparatus 51 based on the control program. For example, the control portion 154 determines the posture of the information processing apparatus 51 based on the posture information from the posture detection portion 151. Based on the determination result, the control portion 154 converts display mode of the display screen displayed in the input and output portion 64. For example, the control portion 154 determines an upward and downward direction of the posture of the information processing apparatus 51 based on the posture information from the posture detection portion 151. Based on the determination result, the control portion 154 converts the upward and downward direction of the display screen displayed in the input and output portion 64.

In addition, for example, when the information processing apparatus 51 and the photographing apparatus 11 are connected to each other via the wireless communication portion 153, the control portion 154 displays the display screen for operating the photographing apparatus 11 in the input and output portion 64. In this case, the control portion 154 performs a control to convert the display mode of the display screen for operating the photographing apparatus 11 based on a relative positional relationship with the photographing apparatus 11. For example, the control portion 154 performs the control to convert the display mode of the display screen based on a distance between the information processing apparatus 51 and the photographing apparatus 11. In this case, for example, the control portion 154 displays the display screen including an operation target for operating the photographing apparatus 11 and performs a control to change the display mode of the operation target based on the relative positional relationship.

In addition, for example, the control portion 154 performs the control to convert the display mode of the display screen based on whether or not the photographing apparatus 11 is mounted in the information processing apparatus 51. In this case, the control portion 154 performs the control to convert the display mode of the display screen based on whether or not the photographing apparatus 11 is mounted on the display surface of the input and output portion 64. In addition, when the photographing apparatus 11 is mounted on the display surface of the input and output portion 64, the control portion 154 performs the control to convert the display mode of the display screen based on a position of the photographing apparatus 11 on the display surface of the input and output portion 64.

An image processing portion 155 conducts predetermined image processing with respect to an image generated by the photographing apparatus 11 or an image generated by the photographing portion 67 (illustrated in the lower part of FIG. 2) and displays the image-processed image on the display portion 172, based on the control of the control portion 154. In addition, the image processing portion 155 stores the images in the storage portion 156, based on the control of the control portion 154. In addition, the image processing portion 155 displays the display screen, which is used when the photographing operation that uses the photographing apparatus 11 is performed, on the display portion 172, based on the control of the control portion 154.

The storage portion 156 is a storage medium which stores various types of information based on the control of the control portion 154. For example, in the storage portion 156, the image generated by the photographing apparatus 11 or the image generated by the photographing portion 67 (illustrated in the lower part of FIG. 2) is stored as the content (for example, the still picture file and the moving picture file). In addition, the storage portion 156 may be embedded in the information processing apparatus 51 and may be detachable from the information processing apparatus 51.

The voice output portion 65 outputs the voice information, based on the control of the control portion 154. The voice output portion 65 can be realized by a speaker or the like.

(Example of Use of Photographing Apparatus and Information Processing Apparatus)

FIG. 5 is a view illustrating an example of use of the photographing apparatus 11 and the information processing apparatus 51 according to the first embodiment of the present disclosure.

In an upper part of FIG. 5, an example of a case where the photographing apparatus 11 used by being mounted in the information processing apparatus 51 is illustrated. For example, as illustrated in the upper part of FIG. 2, the photographing apparatus 11 can be mounted on one surface (a surface opposite to a surface provided with the input and output portion 64) of the information processing apparatus 51. In this case, a user H can use the information processing apparatus 51 which has the photographing apparatus 11 mounted therein, and can perform photographing substantially similar to photographing which uses a general photographing apparatus (for example, the integrated camera).

In a center part of FIG. 5, an example of a case where the photographing apparatus 11 is used without being mounted in the information processing apparatus 51 is illustrated. For example, as illustrated in the center part of FIG. 5, the photographing apparatus 11 can be installed at a location which is apart from the information processing apparatus 51. Even in this case, since the photographing apparatus 11 can be remotely operated by using the information processing apparatus 51, the user H can perform the photographing by using the photographing apparatus 11 and the information processing apparatus 51.

In a lower part of FIG. 5, an example is illustrated which is a case where the photographing apparatus 11 is used without being mounted in the information processing apparatus 51, and a case where a plurality of photographing apparatuses 11-1 to 11-N is remotely operated. For example, as illustrated in the lower part of FIG. 5, the plurality of photographing apparatuses 11-1 to 11-N can be installed at the location which is apart from the information processing apparatus 51. Even in this case, since the user H can use the information processing apparatus 51 and remotely operate the plurality of photographing apparatuses 11-1 to 11-N, it is possible to perform the photographing by using the photographing apparatuses 11-1 to 11-N and the information processing apparatus 51.

As illustrated in FIG. 5, when the photographing apparatus 11 is remotely operated by using the information processing apparatus 51, the information processing apparatus 51 supplies the command to the photographing apparatus 11 as the synchronous operation command or the asynchronous operation command, according to a state of the photographing apparatus 11, or according to the content of the command which indicate the operation.

Here, when the information processing apparatus 51 supplies the command which indicates the operation, the synchronous operation command is a command, which gives a response that is the completion notification of the operation, to the information processing apparatus 51, after the photographing apparatus 11 which receives the command performs the operation according to the command. The information processing apparatus 51 terminates a series of process by the command when the response which is the completion notification.

At this time, after the command is supplied to the photographing apparatus 11, the information processing apparatus 51 is in a state where other commands are not able to be supplied to the photographing apparatus 11 until the response which is the completion notification is received. In other words, the synchronous operation command can realize processing which has high reliability since the next command is supplied after confirming an operation state of the photographing apparatus 11 by the information processing apparatus 51. However, in the synchronous operation command, the communication abnormality or the like occurs, and when a state where the response from the photographing apparatus 11 is not able to be received continues, the information processing apparatus 51 is in a state of waiting for the response, and the operability deteriorates.

Meanwhile, when the information processing apparatus 51 supplies the command which indicates the operation, the asynchronous operation command is a command which is completed only by the operation corresponding to the command by the photographing apparatus 11 which receives the command. Therefore, in a case of the asynchronous operation command, after transmitting the command, since it is not necessary to wait the response from the photographing apparatus 11, the information processing apparatus 51 can immediately transmit the next command. However, in the asynchronous operation command, since the photographing apparatus 11 transmits the response which is an operation result, the information processing apparatus 51 is not able to confirm whether or not the operation corresponding to the command is performed in the photographing apparatus 11.

Therefore, for example, in a case where the number of the photographing apparatuses 11 is greater than a predetermined number, the information processing apparatus 51 uses the asynchronous operation command, and inversely, in a case where the number of the photographing apparatuses 11 is smaller than the predetermined number, the information processing apparatus 51 uses the synchronous operation command. In this manner, by using the command by dividing into the synchronous operation command and the asynchronous operation command, it is possible to adjust the balance between the reliability and the operability of the operation.

[Linking Function Initiation Processing of Photographing System]

Figure 6:
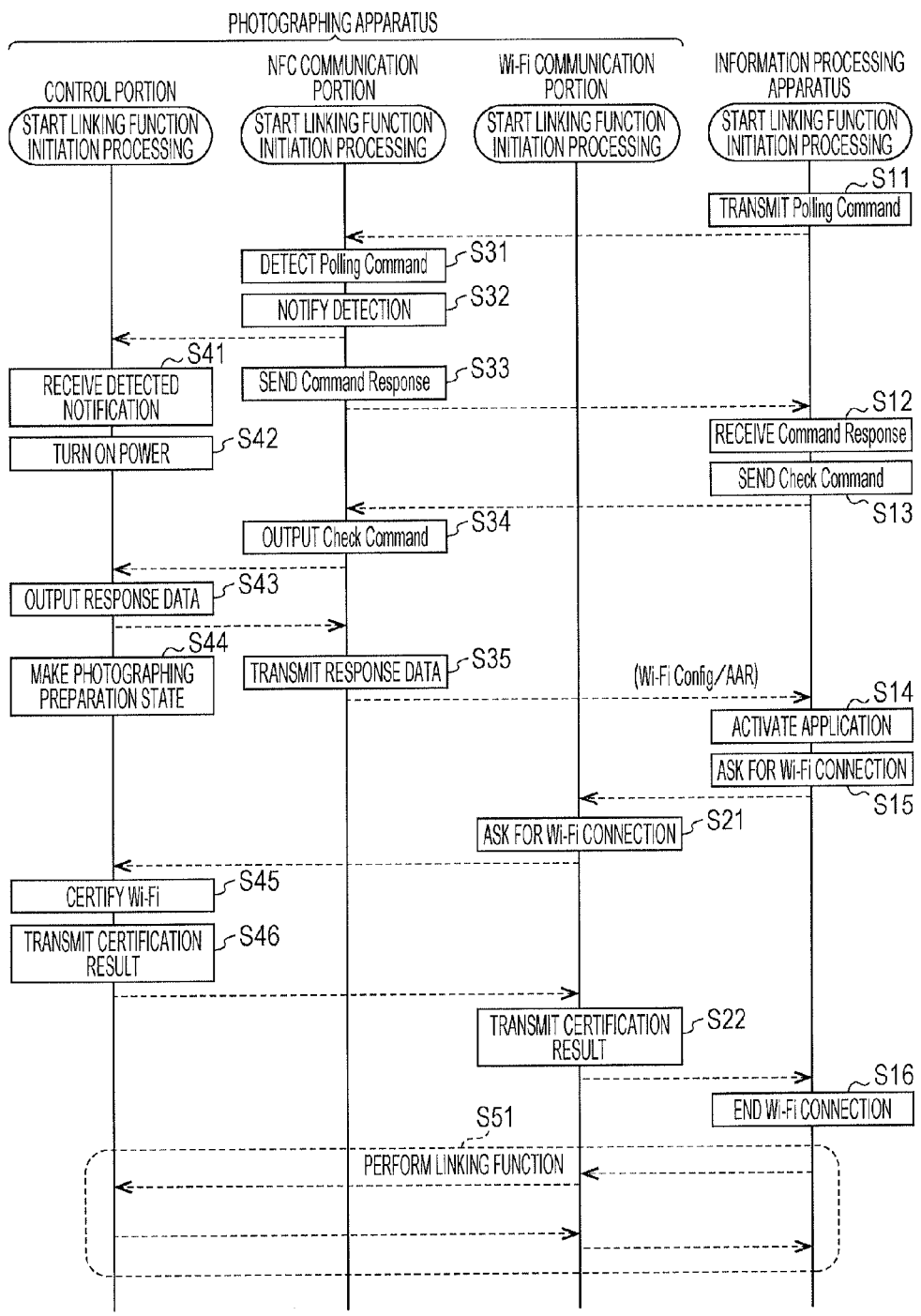
FIG. 6 is a flowchart describing a linking function initiation processing.

Next, a linking function initiation processing of the photographing system which has the photographing apparatus 11 and the information processing apparatus 51 according to the present embodiment will be described with reference to a flow chart of FIG. 6. FIG. 6 is a flow chart illustrating the linking function initiation processing of a control system according to the embodiment.

In Step S11, the control portion 154 of the information processing apparatus 51 controls the NFC communication portion 181 of the wireless communication portion 153 and sends a polling command.

According to the processing, when an antenna (not illustrated) which is controlled by the NFC communication portion 181 of the information processing apparatus 51 and an antenna (not illustrated) which is controlled by the NFC communication portion 121 of the photographing apparatus 11 in a predetermined radio wave reaching range (for example, approximately 7 mm) are included, in Step S31, the NFC communication portion 121 detects the polling command. In addition, as described above, since the NFC communication portion 121 detects the command by a frequency detector of the wireless signal of an NFC band, it is not possible to recognize what kind of command the detected wireless signal is, and it is possible to recognize that a radio frequency (RF) signal of the NFC band is detected.

In Step S32, the NFC communication portion 121 of the wireless communication portion 115 in the photographing apparatus 11 gives notice that the RF signal of the NFC band is detected to the control portion 114.

In Step S41, the control portion 114 receives the detection notification which shows that the RF signal of the NFC band which is supplied by the NFC communication portion 121 is detected.

In Step S42, the control portion 114 outputs a power source control signal according to the detection notification by the NFC communication portion 121 and controls the power source to be turned ON.

Meanwhile, in Step S33, the NFC communication portion 121 of the wireless communication portion 115 sends a command response to the information processing apparatus 51, according to the detection of the RF signal of the NFC band.

In Step S12, the control portion 154 of the information processing apparatus 51 controls the NFC communication portion 181 of the wireless communication portion 153 and detects the command response from the NFC communication portion 121 of the photographing apparatus 11.

In Step S13, the control portion 154 controls the NFC communication portion 181 and sends a check command for discovering an NFC communication target and obtaining predetermined information.

In Step S34, the NFC communication portion 121 of the photographing apparatus 11 receives the check command by the NFC communication and outputs the received check command to the control portion 114.

In Step S43, the control portion 114 outputs response data to the NFC communication portion 121 according to the supplied and received check command. Here, the response data includes the Wi-Fi Config, and the AAR.

In Step S35, the NFC communication portion 121 transmits the response data supplied by the control portion 114, to the information processing apparatus 51 by the NFC communication.

Furthermore, the processing in the above-described Steps S13, S34, S43, and S35 may be performed several times, and the response data may be divided and transmitted several times.

In Step S14, the control portion 154 of the information processing apparatus 51 activates a predetermined application program (hereinafter, simply referred to as an application) according to the received AAR.

Next, in Step S15, the control portion 154 of the information processing apparatus 51 controls the Wi-Fi communication portion 182, uses the received Wi-Fi Config, and asks for the Wi-Fi connection with respect to the photographing apparatus 11.

In Step S21, the control portion 114 of the photographing apparatus 11 controls the Wi-Fi communication portion 122, and obtains the connection request received from the information processing apparatus 51.

Next, in Step S45, the control portion 114 performs the Wi-Fi certification according to the obtained connection request. Furthermore, the Wi-Fi certification may be performed by the Wi-Fi communication portion 122.

In Step S46, the control portion 114 transmits the certification result to the Wi-Fi communication portion 122.

Subsequently, in Step S22, the Wi-Fi communication portion 122 is controlled by the control portion 114, and transmits the certification result to the information processing apparatus 51.

Then, in Step S16, when the certification is successful, the Wi-Fi connection is completed.

As a result, in Step S51, a linking function which uses the Wi-Fi communication is realized between the information processing apparatus 51 and the photographing apparatus 11.

According to the above-described processing, the linking function can be implemented between the information processing apparatus 51 and the photographing apparatus 11. In other words, as illustrated in FIG. 5, the information processing apparatus 51 can remotely operate the photographing apparatus 11. In addition, as the processing described with reference to the flow chart of FIG. 6 is performed with respect to the plurality of photographing apparatuses 11, the information processing apparatus 51 can realize the multi-connection which enables the plurality of photographing apparatuses 11 to be remotely operated.

Here, the multi-connection can allow various forms. On a physical layer, a communication form of the information processing apparatus 51 and the photographing apparatus 11 may be not only the above-described wireless connection but also a form of wired connection.

Figure 7:
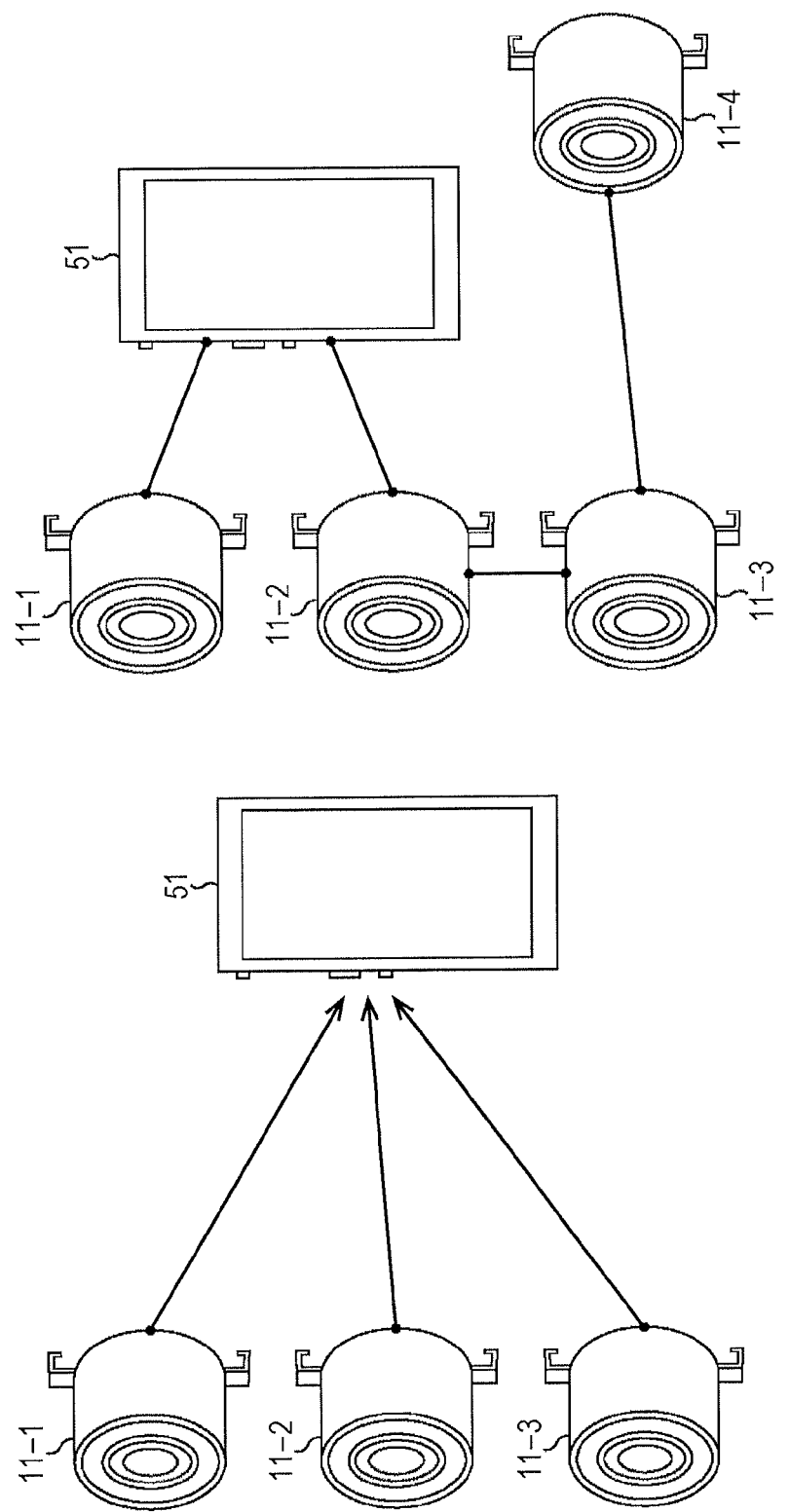
FIG. 7 is a view describing a multi-connection.

Moreover, on a data link layer, as illustrated in a left view of FIG. 7, the information processing apparatus 51 has an access point, and may be in an infrastructure mode in which the photographing apparatuses 11-1 to 11-3 are connected to the access point. In this case, a master-slave relationship in the connection is generated.

In addition, as illustrated in a right view of FIG. 7, the apparatus may be in a so-called pointed hoc mode, in which the information processing apparatus 51 and the photographing apparatuses 11-1 and 11-2 are mutually connected peer-to-peer, the photographing apparatuses 11-2 and 11-3 are mutually connected peer-to-peer, and the photographing apparatuses 11-3 and 11-4 are mutually connected peer-to-peer.

[First Multi-Connection Operation Processing]

Next, with reference to a flow chart of FIG. 8, first multi-connection operation processing, which is remote operation processing realized by the multi-connection by the above-described processing, will be described.

In Step S101, the control portion 114 of the photographing apparatus 11 controls the Wi-Fi communication portion 122 of the wireless communication portion 115, and gives notice of information which shows presence thereof. The information which shows the presence of the photographing apparatus 11 is intrinsic information which is included in the photographing apparatus 11, such as an Internet protocol (IP) address thereof and a media access control (MAC) address, and may be information in which a plurality of types of information is combined.

In Step S131, the control portion 154 of the information processing apparatus 51 controls the Wi-Fi communication portion 182 of the wireless communication portion 153 and determines whether or not notice of the information which shows the presence of the photographing apparatus 11 is given from any of the photographing apparatuses 11. In Step S131, for example, when notice of the information which shows the presence of the photographing apparatus 11 is given by the processing of Step S101, the processing goes to Step S132.

In Step S132, the control portion 154 controls the Wi-Fi communication portion 182 of the wireless communication portion 153 and receives the transmitted information on the presence.

In Step S133, the control portion 154 obtains the received information on the presence and stores the information in the storage portion 156 as management information 191.

Furthermore, in Step S131, when the notification which shows the presence is not transmitted, the processing skips Step S132 and Step S133.

Figure 9:
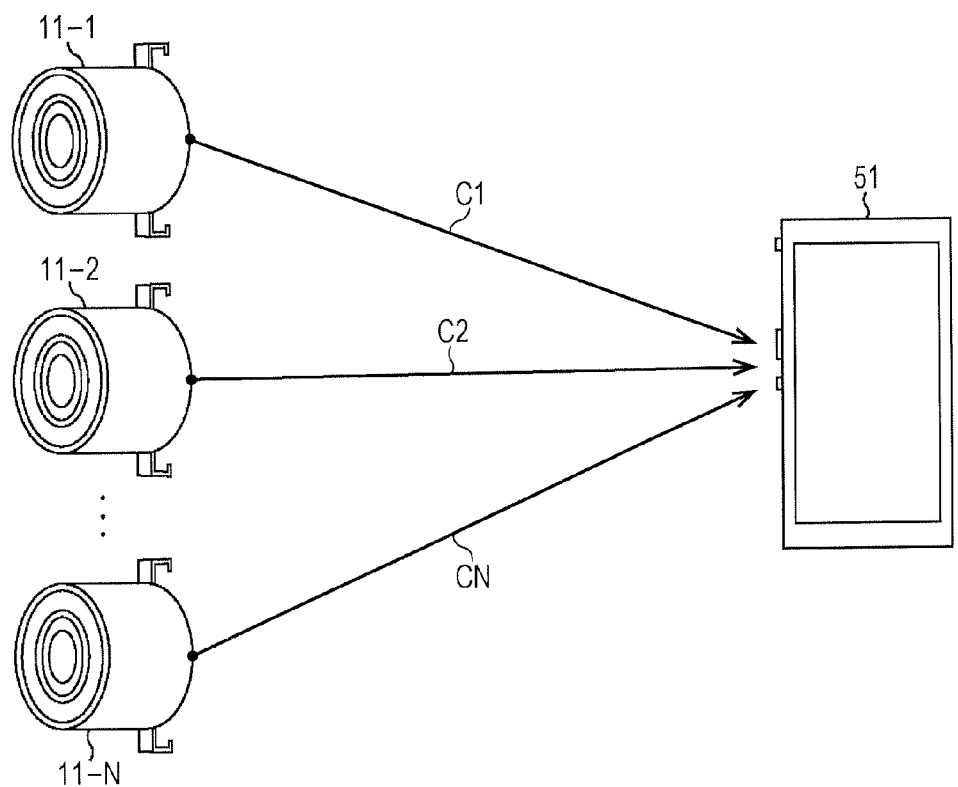
FIG. 9 is a view describing the first multi-connection operation processing.

As illustrated in FIG. 9, when there is the plurality of photographing apparatuses 11-1 to 11-N, information C1 to CN which shows the presence of each of the photographing apparatuses 11-1 to 11-N is transmitted to the information processing apparatus 51. For this reason, the control portion 154 of the photographing apparatus 11 registers the information as information which can recognize the photographing apparatuses 11 in the management information 191, and accommodates the information in the storage portion 156.

In addition, the management information 191 may be updated at a predetermined time interval. In other words, in this case, by repeating Steps S101 and Steps S131 to S133 at the predetermined time interval, the information, which shows the presence of the device which is registered as the management information 191 but of which the notification which shows the presence is not transmitted, is removed from the management information 191. In this manner, by managing the management information 191, only the information on the presence, which is transmitted from a device (for example, photographing apparatus 11) that has a constant Wi-Fi communication, is registered in the management information 191. As a result, the device registered in the management information 191 can immediately recognize that the remote operation by the processing (to be described) is possible.

In Step S134, a predetermined operation is received in the operation reception portion 152 by operating the operation members 61 to 63, or the predetermined operation is received by the input and output portion 64 by operating the input portion 171. Accordingly, the control portion 154 determines whether or not the corresponding predetermined command is input.

In Step S134, when it is determined that the command is input, the processing goes to Step S135.

In Step S135, the control portion 154 reads the management information 191 and determines whether or not the number of the apparatuses is the number which can use the input command as the synchronous operation command, based on the information on the number of the photographing apparatuses 11 which are registered and can be remotely operated.

In other words, even in a case of the same command, whether the command is the synchronous operation command or the asynchronous operation command is changed according to the number of the photographing apparatuses 11 which are registered in the management information 191 and can be remotely operated.

For example, in a case where the command is so-called a shutter-on command which indicates the photographing of a still picture, when the number of the photographing apparatuses 11 registered in the management information 191 is greater than the predetermined number, the command is considered as the asynchronous command. In addition, even in a case of the shutter-on command, when the number of the photographing apparatuses 11 registered in the management information is smaller than the predetermined number, the command is considered as the synchronous operation command.

As described above, in a case of the synchronous operation command, when the processing corresponding to the command is completed in the photographing apparatus 11 which receives the command, the response which is the completion notification is transmitted. However, the information processing apparatus 51 is in a state where another command is not able to be received until the response is transmitted. Therefore, in a case where the number of the photographing apparatuses 11 is greater than the predetermined number, there is a concern that a delay in delivering the response occurs and the operability deteriorates in the information processing apparatus 51, due to a delay of the processing time or any problems on the communication path.

In other words, when the number of the photographing apparatuses 11 which are registered in the management information 191 and can be remotely operated is smaller than the predetermined number, there is a lower risk of a state where the delay in delivering the response which is the completion notification occurs and another command is not received, and there is a smaller possibility of the deterioration of the operability.

In contrast, in a case where the number of the photographing apparatuses 11 which can be remotely operated is greater than the predetermined number, there is a higher risk of a state where the delay of the processing occurs and the response which is the completion notification is not able to be received due to the communication state or the like, and there is greater possibility of the deterioration of the operability.

Here, in a case where the number of the photographing apparatuses 11 registered in the management information 191 is greater than the predetermined number, the control portion 154 transmits the command to the photographing apparatus 11 as the asynchronous operation command without influencing the operability even though there is a greater possibility that the delay in delivering the response occurs.

Meanwhile, in a case where the number of the photographing apparatuses 11 registered in the management information 191 is smaller than the predetermined number, since the possibility that the delay in delivering the response occurs is considered low, the control portion 154 transmits the command to the photographing apparatus 11 as the synchronous operation command.

Here, in Step S135, for example, when the information which shows the presence of the photographing apparatuses 11 of which the number is smaller than the predetermined number is registered in the management information 191, the control portion 154 considers the command as the synchronous operation command, and the processing goes to Step S136.

In Step S136, the control portion 154 controls the Wi-Fi communication portion 182 of the wireless communication portion 153 and simultaneously transmits the input command together with the information which shows that the command is the synchronous operation command, to all the photographing apparatuses 11 registered in the management information.

In Step S102, the control portion 114 of the photographing apparatus 11 controls the Wi-Fi communication portion 122 of the wireless communication portion 115 and determines whether or not the command is transmitted. In Step S102, for example, when the command is transmitted by the processing in Step S136, the processing goes to Step S103.

In Step S103, the control portion 114 determines whether or not the command is the synchronous operation command. In this case, since the transmitted command is the synchronous operation command, the processing goes to Step S104.

In Step S104, the control portion 114 performs the operation corresponding to the command as the synchronous operation command. Here, since the command is the shutter-on command, the control portion 114 controls the photographing portion 111 and photographs, supplies the photographing result to the image processing portion 112, and stores the image which is a processing result in the storage portion 113.

In Step S105, the control portion 114 controls the Wi-Fi communication portion 122 of the wireless communication portion 115 and transmits the response which is the completion notification to the information processing apparatus 51 when the processing indicated by the command is completed.

In Step S137, the control portion 154 controls the Wi-Fi communication portion 182 of the wireless communication portion 153 and receives the response which is the completion notification by the photographing apparatus 11. At this time, the control portion 154 performs the same processing until the response is received from all of the registered photographing apparatuses 11, based on the management information 191 stored in the storage portion 156. Then, when the response is received from all of the photographing apparatuses 11 registered in the management information 191, the processing goes to Step S138.

In Step S138, the control portion 154 determines whether or not the command which is considered input by the processing of Step S134 is an end command. In a case where the command is not the end command, the processing goes back to Step S131. In addition, in Step S138, when it is determined that the command is the end command, the processing ends.

Meanwhile, even in Step S106, when the control portion 154 determines whether or not the supplied command is the end command, and when it is determined that the command is not the end command, the processing goes back to Step S101. In addition, in Step S106, when the command is considered as the end command, the processing ends.

Furthermore, in Step S134, for example, the command is input, and further, in Step S135, when the photographing apparatus 11 of which the number is greater than the predetermined number is registered in the management information 191, the control portion 154 considers the command as the asynchronous operation command, and the processing goes to Step S139.

In Step S139, the control portion 154 controls the Wi-Fi communication portion 182 of the wireless communication portion 153 and simultaneously transmits the input command together with the information which shows that the command is the asynchronous operation command, to all of the photographing apparatuses 11 registered in the management information 191.

According to this processing, in Step S102, the command is considered transmitted, and the processing goes to Step S103.

In Step S103, the control portion 114 determines whether or not the input command is the synchronous operation command. In this case, since the command is the asynchronous operation command, the processing goes to Step S107.

In Step S107, the control portion 114 performs an operation corresponding to the command which is the asynchronous operation command, and the processing goes to Step S106.

Figure 10:
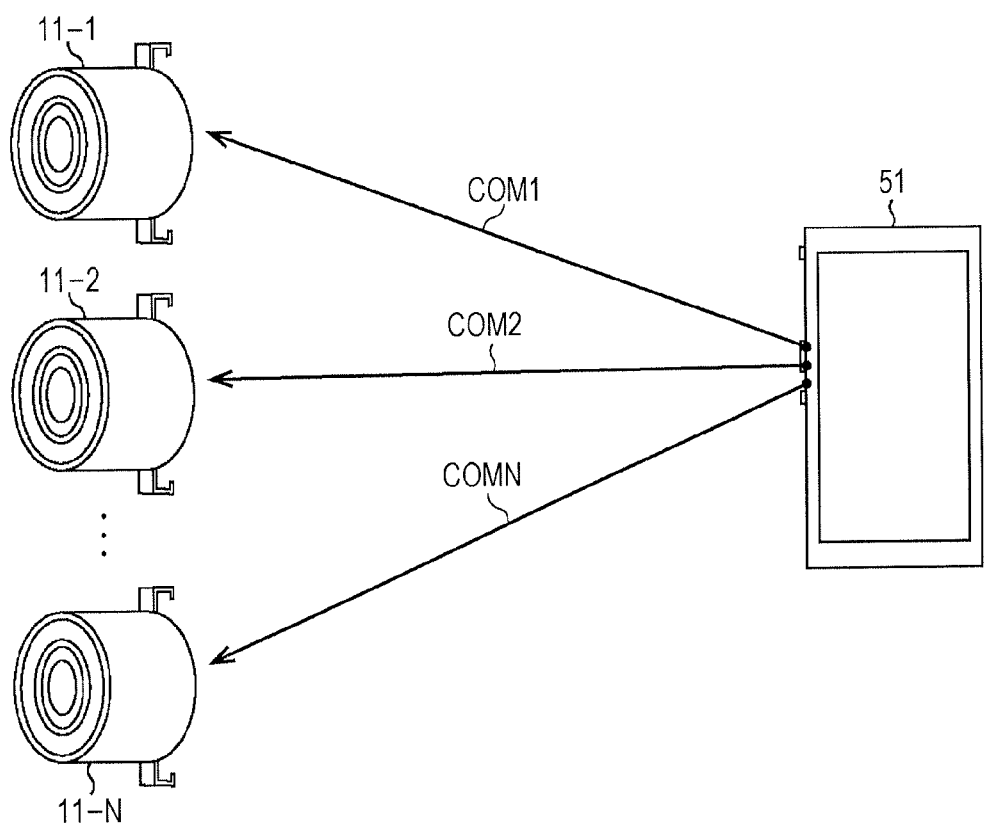
FIG. 10 is a view describing the first multi-connection operation processing.

According to this processing, as illustrated in FIG. 10, commands COM1 to COMN transmitted to the photographing apparatuses 11-1 to 11-N by the information processing apparatus 51 are simultaneously transmitted. Accordingly, even when the command is either the synchronous operation command or the asynchronous operation command, it is possible to suppress the delay which occurs when a sequential processing is performed.

In other words, for example, when the synchronous operation command is supplied to the plurality of photographing apparatuses 11-1 to 11-N in order, the transmission of the commands to the photographing apparatuses 11 which are late in order can be delayed.

Figure 11:
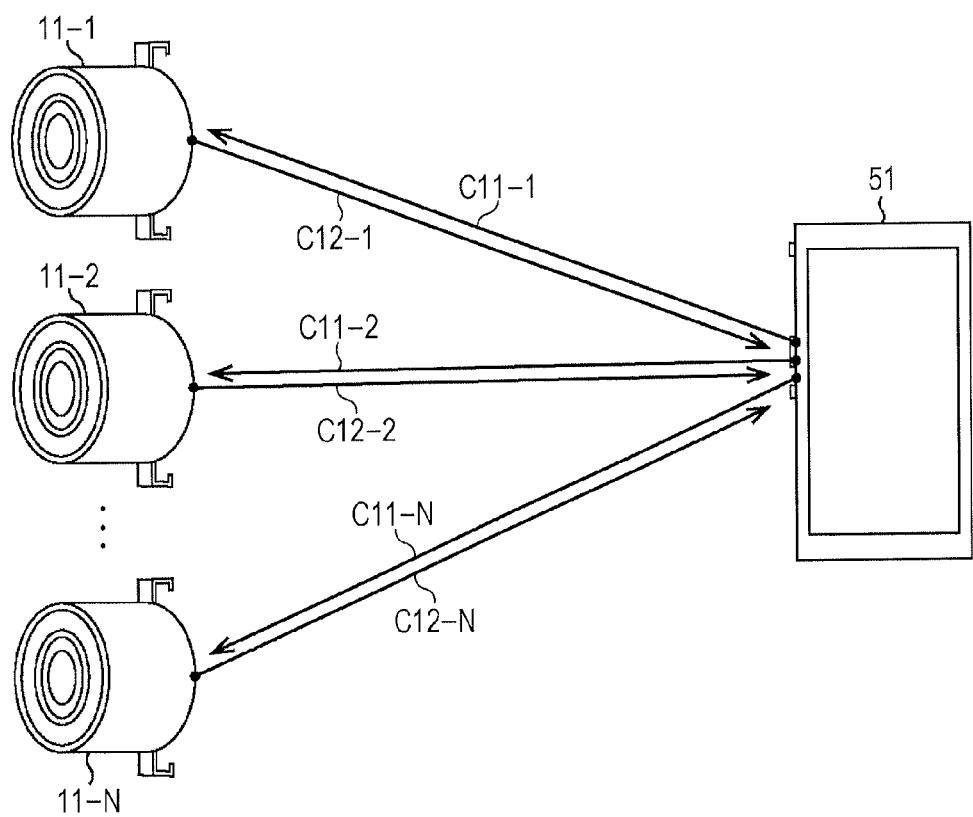
FIG. 11 is a view describing the first multi-connection operation processing.

For example, when the synchronous operation command is transmitted to the plurality of photographing apparatuses 11-1 to 11-N in order, the processing is performed as illustrated in FIG. 11. In other words, after a synchronous operation command C11-1 is transmitted to the photographing apparatus 11-1 by the information processing apparatus 51, and the processing of the photographing apparatus 11-1 is performed by the command, then a response C12-1 corresponding to the photographing apparatus 11-1 is transmitted to the information processing apparatus 51.

Next, when the response C12-1 is received by the information processing apparatus 51, a synchronous operation command C11-2 is transmitted to the photographing apparatus 11-2. After the processing of the photographing apparatus 11-2 is performed by the command, a response C12-2 corresponding to the photographing apparatus 11-2 is transmitted to the information processing apparatus 51.

When the similar processing is sequentially repeated, in the end, the synchronous operation command C11-N is transmitted to the photographing apparatus 11-N. After the processing of the photographing apparatus 11-N is performed by the command, a response C12-N corresponding to the photographing apparatus 11-N is transmitted to the information processing apparatus 51, and a series of processing ends.

However, in this case, regarding timing when the command C11-1 is transmitted, the timing when the command C11-N is transmitted is the timing after the processing is performed by the (N−1) photographing apparatus 11. For this reason, in each case of photographing apparatuses 11-1 to 11-N, a time lag occurs at the timing when the command is performed.

In addition, even when the synchronous operation commands are simultaneously transmitted, there is a concern that the synchronous operation command is not transmitted to the photographing apparatus 11 from the information processing apparatus 51 due to instability of the communication state, or conversely, due to the delay of the response to the information processing apparatus 51 from the photographing apparatus 11, the delay of the operation occurs as the information processing apparatus 51 continues waiting for the response.

Figure 12:
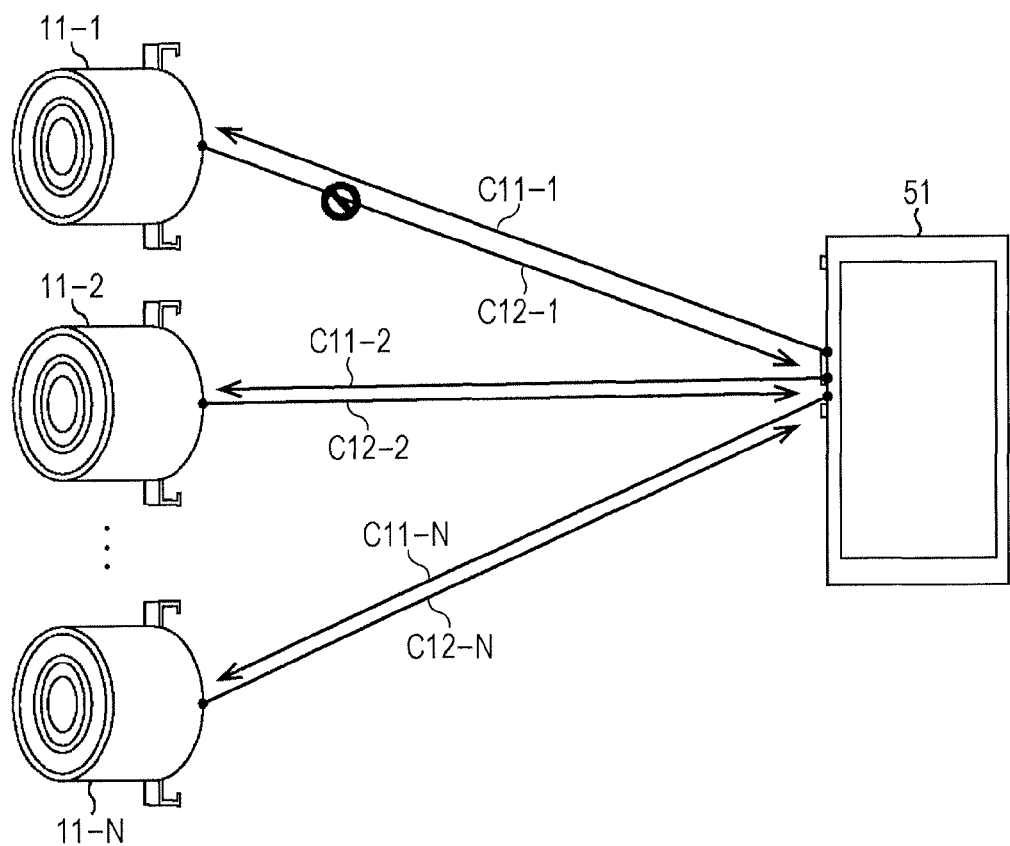
FIG. 12 is a view describing the first multi-connection operation processing.

In other words, as illustrated in FIG. 12, even when the commands C11-1 to 11-N, which are the synchronous operation commands, are simultaneously transmitted to the photographing apparatuses 11-1 to 11-N from the information processing apparatus 51, due to the instability of the communication, there is a case where the response C12-1 is not able to be received. In this case, since the information processing apparatus 51 continues waiting until all the responses from the photographing apparatus 11 registered in the management information 191 are received, there is a concern that other processing is delayed.

However, as described above, corresponding to the number of the photographing apparatuses 11 registered in the management information 191, in a case where the number of registered photographing apparatuses 11 is smaller than the predetermined number, since there is a lower risk of the delay of the response, it is possible to realize a reliable operation, as the command is the synchronous operation command.

Meanwhile, when the plurality of photographing apparatuses 11 of which the number is greater than the predetermined number is registered in the management information 191, by simultaneously transmitting the asynchronous operation command, it is possible to suppress the delay in delivering which occurs as the commands are sent off to the plurality of photographing apparatuses 11 in order. In addition, in this case, since the information processing apparatus 51 does not wait for the response, the response is not acquired due to the communication situation or the like. For this reason, it is possible to avoid a state where the information processing apparatus 51 continues waiting for the response and another command is not received.

In addition, the synchronous operation command and the asynchronous operation command can be converted to each other based on the number of the photographing apparatuses 11 registered in the management information and can be remotely operated. For this reason, the user can appropriately convert a type of the command without being conscious thereof. In addition, the user can avoid a state where the information processing apparatus 51 continues waiting for the response and another command is not received as described above, without being conscious thereof.

As a result, it is possible to appropriately adjust the reliability and the operability in the remote operation.

2. Second Embodiment

In the above, an example, in which, in the information processing apparatus 51, the command is determined as the synchronous operation command or the asynchronous operation command according to the number of the photographing apparatuses 11, is described. Furthermore, the command may be determined as the synchronous operation command or the asynchronous operation command according to the operation mode which is in the operation state of the photographing apparatus 11.

Furthermore, since a basic configuration which realizes the information processing apparatus 51 and the photographing apparatus 11 is substantially similar to the configuration described with reference to FIG. 4, the description thereof will be omitted. However, in the second embodiment, the photographing apparatus 11 transmits the information, such as the operation mode, together with the IP address or the MAC address thereof, to the information processing apparatus 51. Accordingly, the information processing apparatus 51 registers the operation modes in the management information 191, in association with each of photographing apparatuses 11. Then, the control portion 154 of the information processing apparatus 51 determines whether the command is the synchronous operation command or the asynchronous operation command, based on the information on the operation mode of the photographing apparatus 11 registered in the management information 191.

[Second Multi-Connection Operation Processing]

Figure 13:
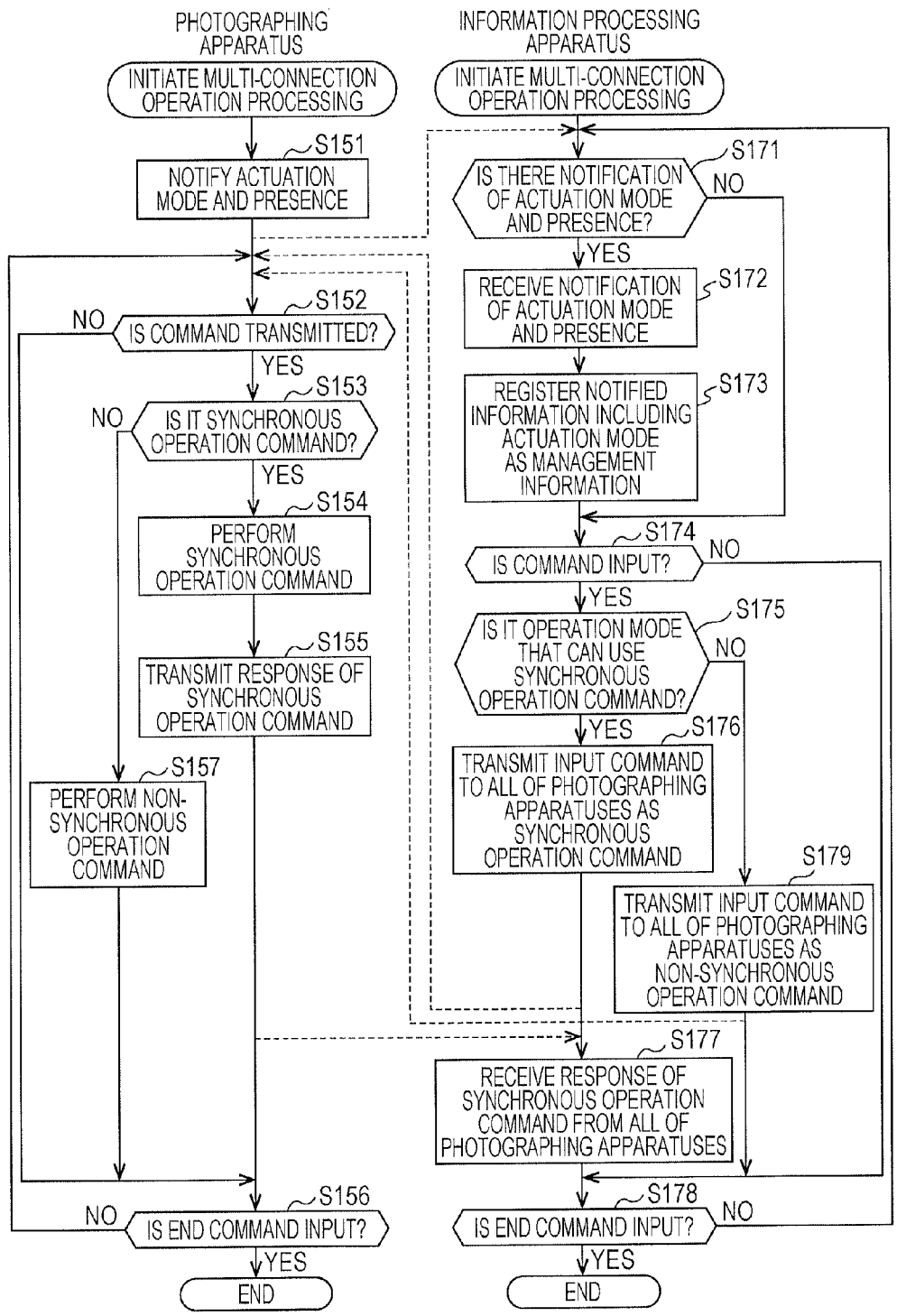
FIG. 13 is a flow chart describing second multi-connection operation processing according to a second embodiment of the present disclosure.

Next, with reference to a flow chart of FIG. 13, second multi-connection operation processing which determines whether the command is the synchronous operation command or the asynchronous operation command corresponding to the operation mode which is in the operation state of the photographing apparatus 11, will be described. Furthermore, since the processing in Steps S152 to S157 and Steps S176 to S179 in the flow chart of FIG. 13 is similar to the processing in Steps S102 to S107 and Steps S136 to S139 in the flow chart of FIG. 8, the description thereof will be appropriately omitted.

In other words, in Step S151, the control portion 114 of the photographing apparatus 11 controls the Wi-Fi communication portion 122 of the wireless communication portion 115 and gives notice of the presence thereof. As the information which shows the presence of the photographing apparatus 11, in addition to the intrinsic information which is included in the photographing apparatus 11, such as the Internet protocol (IP) address thereof and the media access control (MAC) address, information on the operation mode is transmitted. The information on the operation mode is, for example, information, such as a drive mode (whether or not the continuous photographing mode) and a photographing mode (a person photographing mode, a night scene photographing mode, or the like), but may be information on other operation mode.

In Step S171, the control portion 154 of the information processing apparatus 51 controls the Wi-Fi communication portion 182 of the wireless communication portion 153 and determines whether or not the information which shows the presence of the photographing apparatus 11 and the information on the operation mode is transmitted from any of the photographing apparatuses 11. In Step S181, for example, when the notification which shows the presence of the photographing apparatuses 11 itself and the information on the operation mode is transmitted from the photographing apparatus 11 by the processing of Step S151, the processing goes to Step S172.

In Step S172, the control portion 154 controls the Wi-Fi communication portion 182 of the wireless communication portion 153 and receives the transmitted information on the presence and the information on the operation mode.

In Step S173, the control portion 154 stores the received information on the presence in the storage portion 156 as the management information 191. Here, in the managed management information 191, the information on the operation mode is also registered in correlation with the IP address and the MAC address.

Furthermore, in Step S171, when the notification which shows the presence of the photographing apparatus and the information on the operation mode are not transmitted, the processing in Step S172 and Step S173 is skipped.

In Step S174, a predetermined operation is received in the operation reception portion 152 by operating the operation members 61 to 63, or the predetermined operation is received by the input and output portion 64 by operating the input portion 171. Then, the control portion 154 determines whether or not the corresponding predetermined command is input.

In Step S174, when it is determined that the command is input, the processing goes to Step S175.

In Step S175, the control portion 154 determines whether or not the input command can be the synchronous operation command, based on the information on the operation mode of the photographing apparatus 11 registered in the management information 191.

In other words, for example, among the photographing apparatuses 11 registered in the management information 191, with respect to the input command, even in a case where one apparatus is in the operation mode (for example, the night scene photographing mode which has a long exposure time or the continuous photographing mode) in which the processing time is longer than the predetermined time, the control portion 154 outputs the input command as the asynchronous operation command, and in other cases, outputs the command as the synchronous operation command.

In this manner, based on the information on the operation mode registered in the management information 191, the information processing apparatus 51 determines whether the command is the asynchronous operation command or the synchronous operation command, corresponding to the state of the photographing apparatus 11, and transmits the command to the photographing apparatus 11.

Accordingly, corresponding to the operation state realized by the operation mode of the photographing apparatus 11, the information processing apparatus 51 can appropriately convert the command to the synchronous operation command or the asynchronous operation command and supplies the command to the photographing apparatus 11. As a result, it is possible to avoid a situation in which the information processing apparatus 51 continues waiting for the response of the synchronous operation command and is not able to input the next command, and to ensure the operation state if necessary.

3. Third Embodiment

In the above, an example, in which the synchronous operation command and the asynchronous operation command are converted to each other according to the number of the photographing apparatuses 11 which are registered in the management information 191 and can be remotely operated, or the operation mode, is described. However, a determination according to another condition also may be possible.

In other words, for example, when a state where the response is not able to be received is likely to occur, in many cases, a processing load which is performed based on the command in the photographing apparatus 11 is high, and the processing time is longer. Here, a command in which the processing time generally is longer than the predetermined time, for example, a command which indicates high dynamic range (HDR) photographing, a super high-sensitivity photographing which has a long-time exposure time, and a continuous photographing, may be the asynchronous operation command. A command in other cases may be the synchronous operation command.

Furthermore, since a basic configuration which realizes the information processing apparatus 51 and the photographing apparatus 11 is substantially similar to the configuration described with reference to FIG. 4, the description thereof will be omitted. However, in the third embodiment, the control portion 154 of the information processing apparatus 51 determines whether the command is the synchronous operation command or the asynchronous operation command, based on the content of the command in addition to the number of the photographing apparatuses 11 registered in the management information 191.

[Third Multi-Connection Operation Processing]

Figure 14:
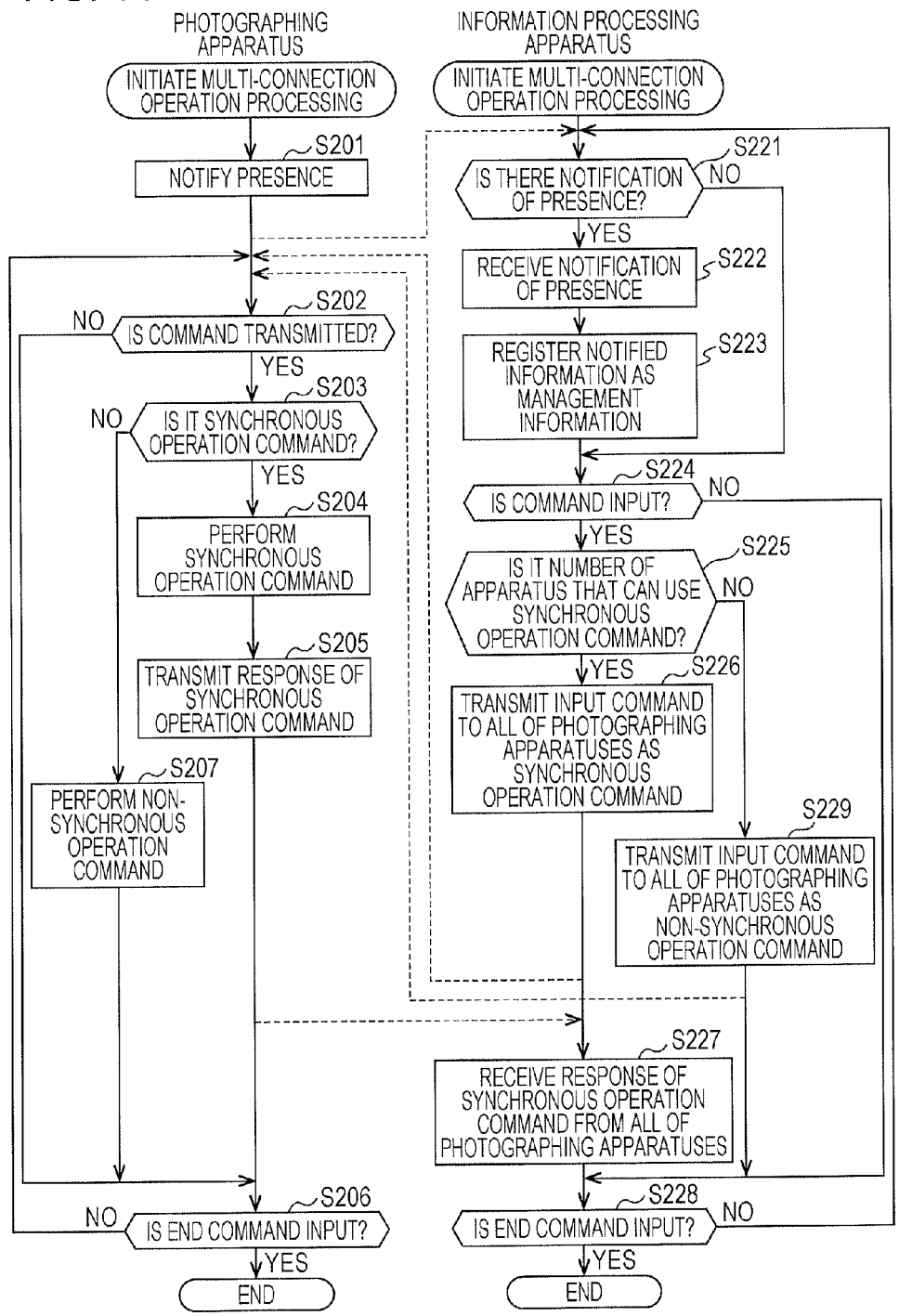
FIG. 14 is a flow chart describing third multi-connection operation processing according to a third embodiment of the present disclosure.

Next, with reference to a flow chart of FIG. 14, third multi-connection operation processing, which determines whether the command is the synchronous operation command or the asynchronous operation command according to the processing time corresponding to the command supplied to the photographing apparatus 11, will be described. Furthermore, since the processing in Steps S201 to S207, Steps S221 to S224, and Steps S226 to S229 in the flow chart of FIG. 14 is similar to the processing in Steps S101 to S107, Steps S131 to S134, and Steps S136 to S139 in the flow chart of FIG. 8, the description thereof will be appropriately omitted.

In other words, in Step S225, the control portion 154 determines whether or not the command is the synchronous operation command in which the number of the photographing apparatuses 11 which can be remotely operated and are registered in the management information 191 is smaller than the predetermined number, the processing load which is performed based on the command is low, and the processing time is not long.

More specifically, the control portion 154 considers a case where the number of the photographing apparatuses 11 which can be remotely operated is smaller than the predetermined number, and the input command is not the command which takes the processing time, such as the high dynamic range (HDR) photographing, the super high-sensitivity photographing having a long-time exposure, and the continuous photographing, as the synchronous operation command. The control portion 154 considers other cases as the synchronous operation command.

According to this processing, the synchronous operation command and the asynchronous operation command are converted to each other according to not only to the number of the photographing apparatuses 11 which can be remotely operated, but also the size of the processing load related to the operation corresponding to the input command.

As a result, it is possible to appropriately adjust the balance between the reliability and the operability of the operation. Furthermore, in the above, an example, in which the synchronous operation command and the asynchronous operation command are converted to each other according to the number of the photographing apparatuses 11 which can be remotely operated and the processing time when the command is performed, is described. However, the synchronous operation command and the asynchronous operation command may be converted to each other according to only the content of the command.

4. Fourth Embodiment

In the above, an example, in which the input command is supplied to the photographing apparatus 11 as the synchronous operation command or the asynchronous operation command according to the number of the photographing apparatuses 11 registered in the management information, the operation mode thereof, and the processing time when the command is performed, is described.

However, for example, when the multi-connection is realized in a state where the peer-to-peer connection is performed as illustrated in the right view of FIG. 7, it is possible to consider that a problem is likely to occur on the communication path as the hop count of the formed topology is high. Here, the command may be divided into the synchronous operation command and the asynchronous operation command and be supplied, according to the hop count when the topology is formed between the information processing apparatus 51 and the photographing apparatus 11.

In other words, for example, a state where the response is not received is likely to occur as the hop count is high. Here, in a case where the number of the photographing apparatuses 11 which can be remotely operated is smaller than the predetermined number and within a predetermined hop count in any case, the command may be the synchronous operation command, and in other cases, the command may be the asynchronous operation command.

Furthermore, since a basic configuration which realizes the information processing apparatus 51 and the photographing apparatus 11 is substantially similar to the configuration described with reference to FIG. 4, the description thereof will be omitted. However, in the fourth embodiment, the control portion 154 of the information processing apparatus 51 registers the hop count of each photographing apparatus 11, in addition to the number of the photographing apparatuses 11 registered in the management information 191.

[Fourth Multi-Connection Operation Processing]

Figure 15:
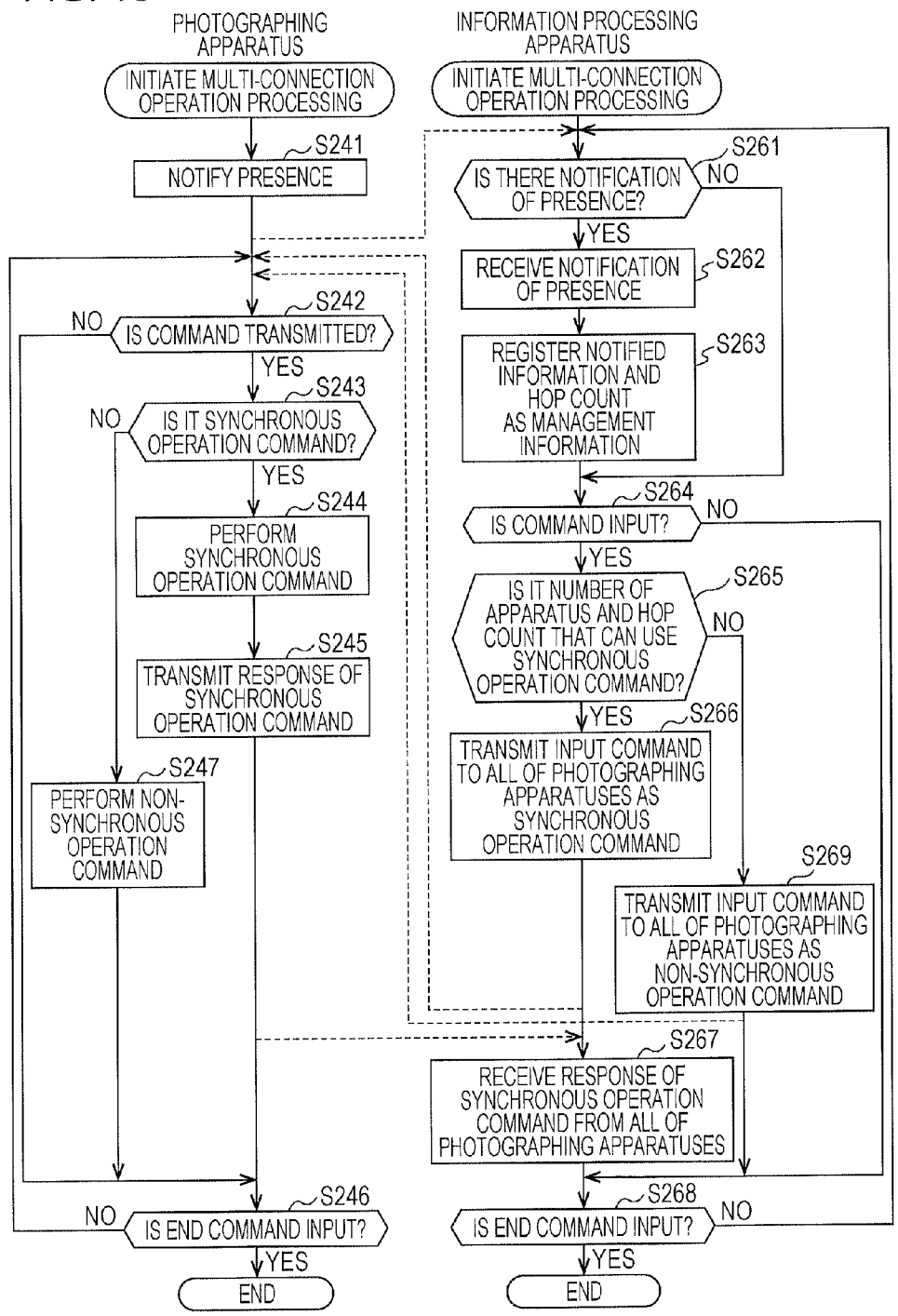
FIG. 15 is a flow chart describing fourth multi-connection operation processing according to a fourth embodiment of the present disclosure.

Next, with reference to a flow chart of FIG. 15, fourth multi-connection operation processing which determines whether the command is the synchronous operation command or the asynchronous operation command, according to the hop count of the photographing apparatus 11 with respect to the information processing apparatus 51, will be described. Furthermore, since the processing in Steps S241 to S247, Steps S261, S262, and S264, and Steps S266 to S269 in the flow chart of FIG. 15 is similar to the processing in Steps S101 to S107, Steps S131, S132, and S134, and Steps S136 to S139 in the flow chart of FIG. 8, the description thereof will be appropriately omitted.

In other words, in Step S263, the control portion 154 stores the received information on the presence in the storage portion 156 as the management information 191. Here, in the managed information, information on the hop count is also registered in correlation with the IP address or the MAC address.

In Step S265, the control portion 154 determines whether or not the command can be the synchronous operation command, according to whether or not the number of the photographing apparatuses 11 which is registered in the management information 191 and can be remotely operated is smaller than the predetermined number, and according to whether or not the hop count of all of the photographing apparatuses 11 is smaller than the predetermined number.

For example, in a case of FIG. 7, the hop count of the photographing apparatuses 11-1 and 11-2 with respect to the information processing apparatus 51 is 0, the hop count of the photographing apparatus 11-3 is 1, and the hop count of the photographing apparatus 11-4 is 2.

Here, for example, if the command is the synchronous operation command in a case where the number of the photographing apparatuses 11 which can be remotely operated is smaller than 5, and the hop count is 1 or less in all apparatuses, in an example of FIG. 7, since the hop count of the photographing apparatus 11-4 is 2, the command is not considered as the synchronous operation command (is considered as the asynchronous operation command).

Meanwhile, in the example of FIG. 7, if the photographing apparatus 11-4 is not present, the hop count of the photographing apparatuses 11-1 to 11-3 is 1 or less. For this reason, the command is considered as the synchronous operation command.

According to this processing, the synchronous operation command and the asynchronous operation command are converted to each other according to not only the number of the photographing apparatuses 11 which can be remotely operated but also the hop count.

As a result, it is possible to appropriately make the reliability and the operability of the operation balanced.

Furthermore, in the above, an example, in which the synchronous operation command and the asynchronous operation command are converted to each other according to the number of the photographing apparatuses 11 which can be remotely operated and according to the hop count, is described, but the synchronous operation command and the asynchronous operation command may be converted to each other only by the hop count.

5. Fifth Embodiment

In the above, an example, in which the operation members 61 to 63 or the input and output portion 64, which are provided in the main body of the information processing apparatus 51, are operated based on the input command, is described, but the command may be input from an outer apparatus other than the information processing apparatus 51. In this case, when the command is from the outer apparatus, the response is not necessary. For this reason, the command may be the asynchronous operation command.

For example, by using a release button which has the remote controller, the command may be supplied to the information processing apparatus 51. Based on the command, the information processing apparatus 51 may be able to control to supply the command to the plurality of photographing apparatuses 11.

Figure 16:
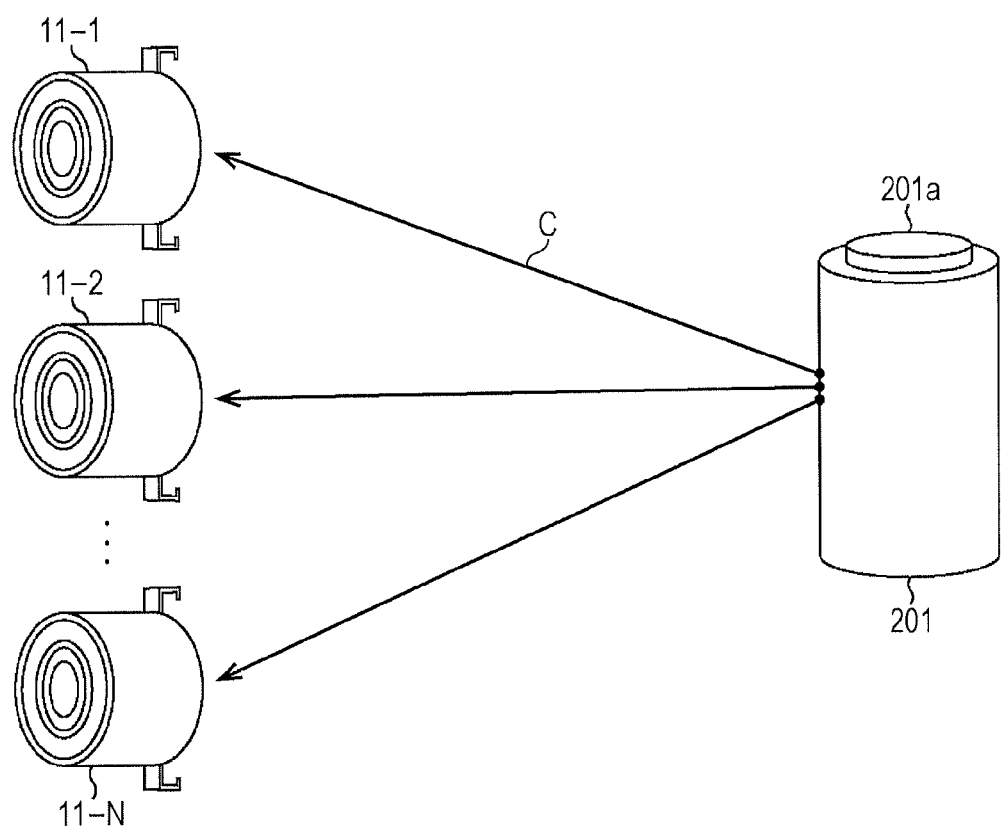
FIG. 16 is a view describing the third multi-connection operation processing by a remote controller according to a fifth embodiment of the present disclosure.

By realizing this, as a remote controller 201 in a release button shape is operated, as illustrated in FIG. 16, a configuration in which the remote operation is possible as the command C is transmitted to all of the photographing apparatuses 11-1 to 11-N is realized.

(Configuration Example of Remote Controller)

Figure 17:
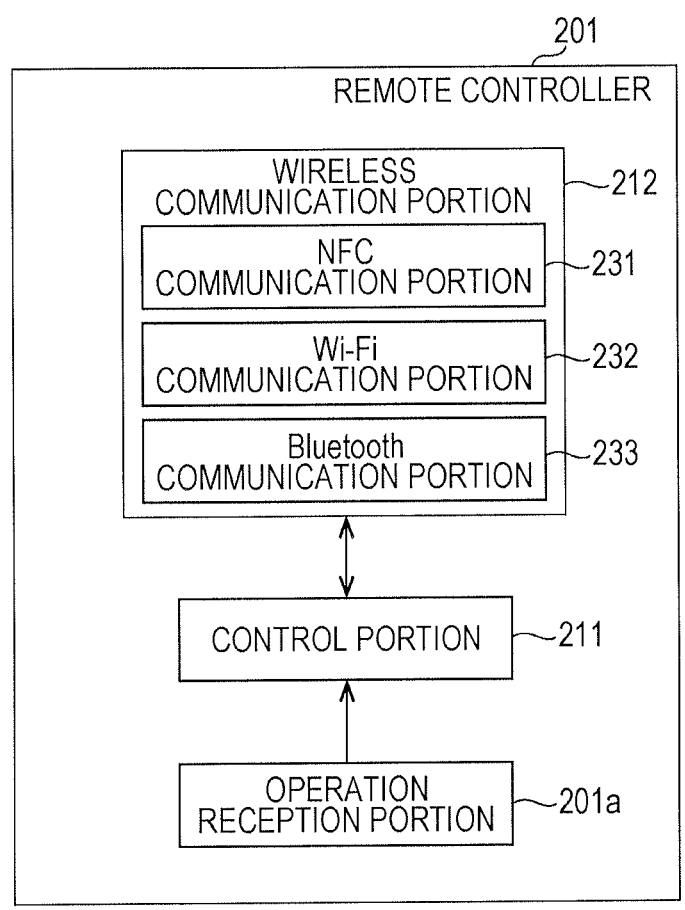
FIG. 17 is a block diagram describing a functional configuration example which realizes a function of the remote controller according to the fifth embodiment of the present disclosure.

Next, with reference to a block diagram of FIG. 17, a functional configuration example which realizes a function of a remote controller 201 will be described.

In the remote controller 201, an operation reception portion 201a which has an operation button on an upper surface thereof is provided. When the user pushes the operation reception portion 201a, a signal which has a command, such as shutter-on, a moving picture photographing initiation, or a moving picture photographing end, is supplied to the information processing apparatus 51 by the wireless communication or the like. Based on the command, the information processing apparatus 51 supplies the command to photograph the still picture, initiate the photographing of the moving picture, and stop the photographing, to the photographing apparatus 11, and performs the operation corresponding to the command.

The remote controller 201 has a control portion 211, a wireless communication portion 212, and the operation reception portion 201a.

The operation reception portion 201a is the operation button, generates a corresponding operation signal by being pushed by the user, and supplies the signal to the control portion 211.

The control portion 211 is configured to have a microcomputer or the like which controls the entire operation of the remote controller 201. When the operation signal is supplied from the operation reception portion 201a, the control portion 211 controls the wireless communication portion 212 and supplies the corresponding command to the information processing apparatus 51 in a wireless manner.

The wireless communication portion 212 transmits the command to the information processing apparatus 51 by using the wireless communication. More specifically, the wireless communication portion 212 has a near field communication (NFC) communication portion 231, a wireless fidelity (Wi-Fi) communication portion 232, and a Bluetooth communication portion 233. Any of these corresponds to the wireless communication portion 115 (photographing apparatus 11) and the wireless communication portion 153 (information processing apparatus 51). However, since the remote controller 201 may be a remote controller which can unilaterally transmit the command to the information processing apparatus 51, a configuration which is simpler than the communication functions may be used. For example, a configuration may be used in which the command can be supplied to the photographing apparatus 11 by a communication function of an infrared ray communication type. However, here, since a function which corresponds to the wireless communication portion 153 having the information processing apparatus 51 is provided, such a configuration example is given.

[Fifth Multi-Connection Operation Processing]

Next, with reference to a flow chart in FIG. 18, fifth multi-connection operation processing will be described which determines that the command is the synchronous operation command in a case where the number of the photographing apparatuses 11 which can be remotely operated is smaller than the predetermined number, and in a case where the command is a command which is supplied by operating the operation members 61 to 63 of the main body of the information processing apparatus 51 or the input and output portion 64 (when the command is not a command from the remote controller 201).

Figure 8:
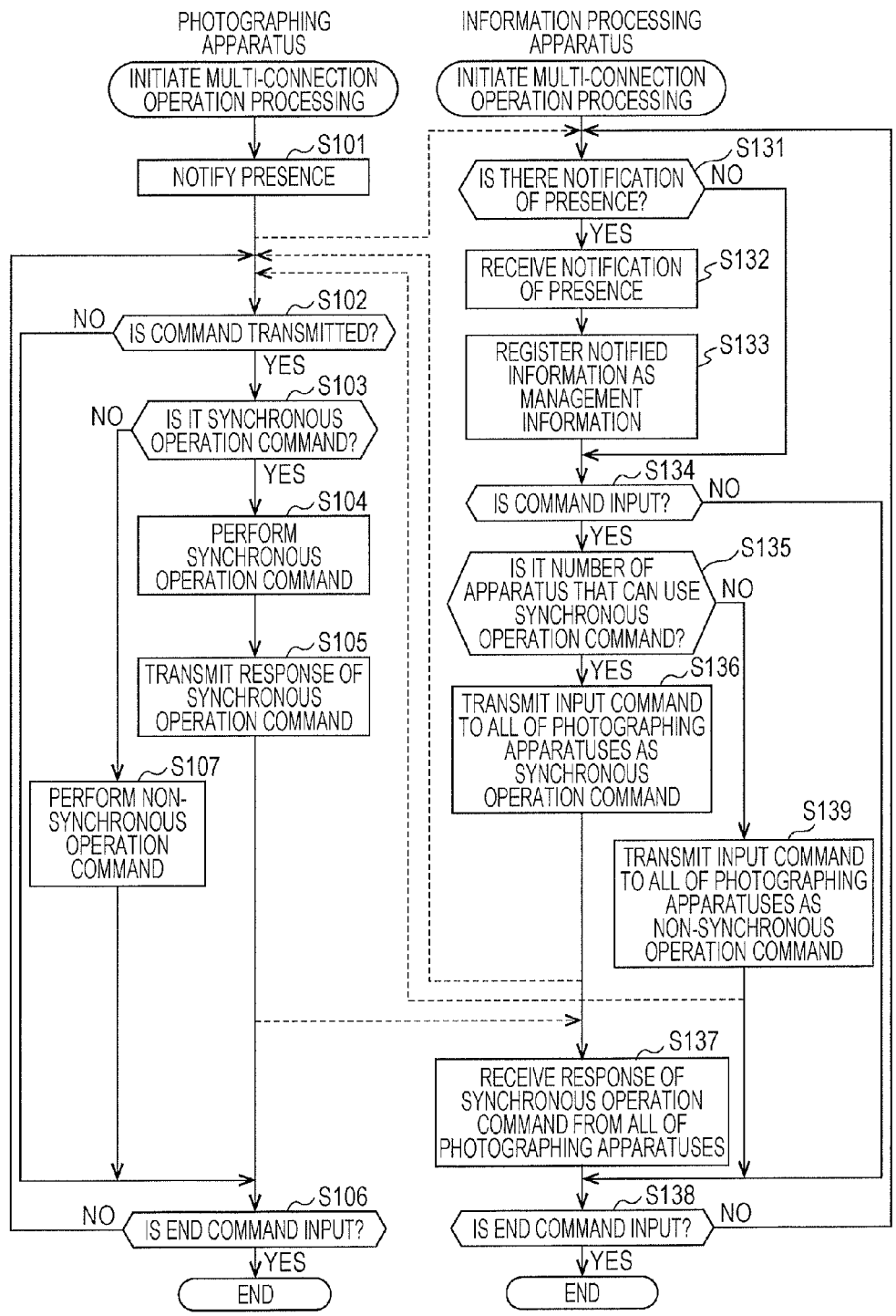
FIG. 8 is a flow chart describing first multi-connection operation processing.
Figure 18:
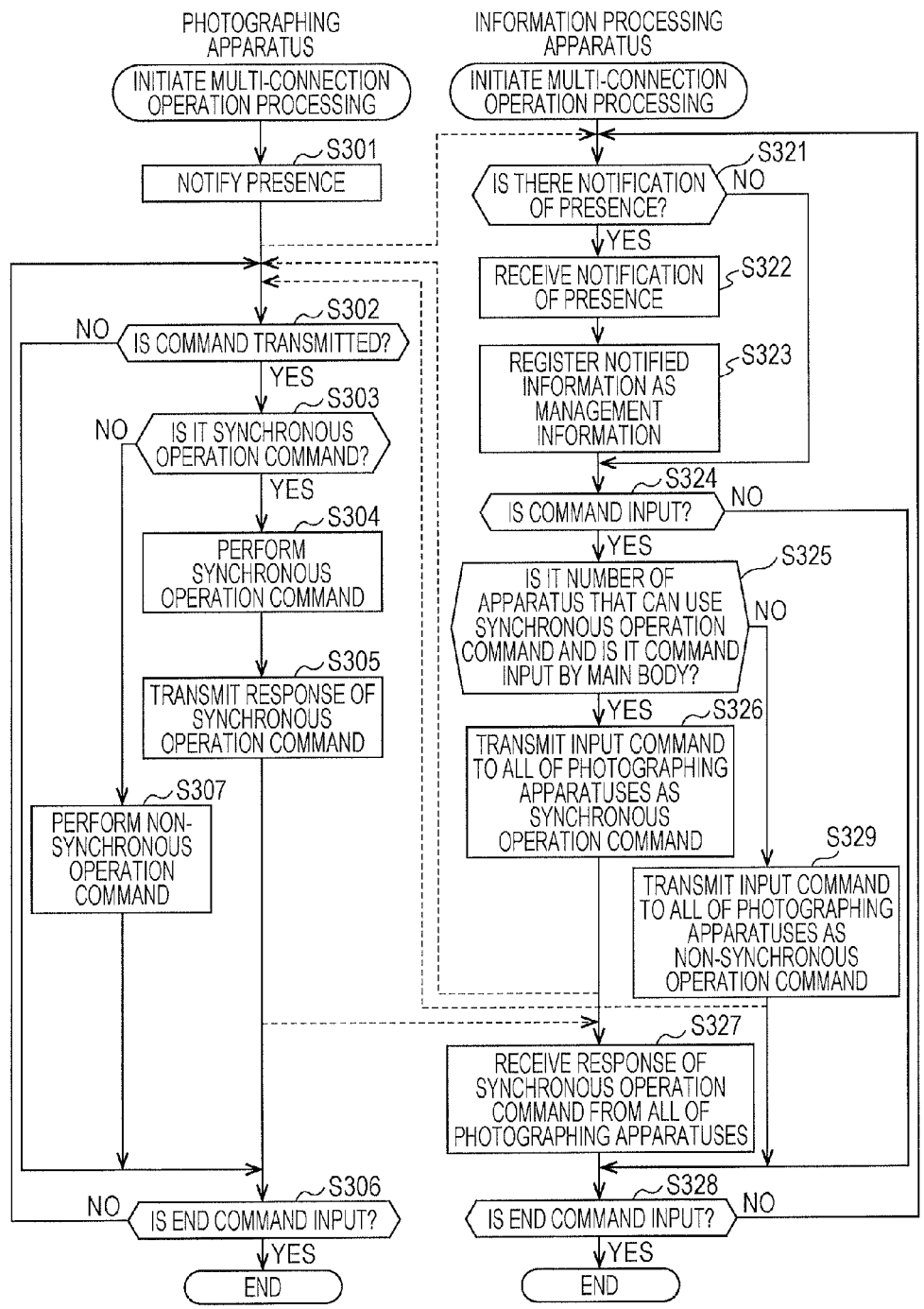
FIG. 18 is a flow chart describing fifth multi-connection operation processing according to the fifth embodiment of the present disclosure.

Furthermore, since the processing in Steps S301 to S307, Steps S321 to S323, and Steps S326 to S329 in the flow chart of FIG. 18 is similar to the processing in Steps S101 to S107, Steps S131 to S133, and Steps S136 to S139 in the flow chart of FIG. 8, the description thereof will be appropriately omitted.

In other words, in Step S324, the control portion 154 determines whether or not the corresponding predetermined command is input by operating the operation reception portion 152, the input and output portion 64, or the operation reception portion 201a of the remote controller 201 as the operation members 61 to 63 are operated. In Step S324, when the command is input by any of the methods, the processing goes to Step S325.

In Step S325, the control portion 154 determines whether or not the command is the synchronous operation command according to whether or not the number of the photographing apparatuses 11 which are registered in the management information 191 and can be remotely operated is smaller than the predetermined number, and the command is supplied by operating the operation members 61 to 63 of the main body or the input and output portion 64 (when the command is not a command from the remote controller 201).

In other words, for example, in a case where the number of the photographing apparatuses 11 which are registered in the management information 191 and can be remotely operated is smaller than the predetermined number, in Step S325, when the command is a command which receives the predetermined operation in the operation reception portion 152, or receives the predetermined operation from the input and output portion 64 by the operation of the input portion 171, the control portion 154 considers the command as the synchronous operation command.

Meanwhile, in Step S325, when the command is a command which is input by the operation of the remote controller 201, even in a case where the number of the photographing apparatuses 11 registered in the management information 191 and can be remotely operated is smaller than the predetermined number, the control portion 154 considers the command as the asynchronous operation command.

According to this processing, the synchronous operation command and the asynchronous operation command are converted to each other according to not only the number of the photographing apparatuses 11 which can be remotely controlled, but also whether or not the command is input from the main body of information processing apparatus 51.

Accordingly, with respect to the remote controller 201 which is the outer apparatus that is used apart from the information processing apparatus 51, since the asynchronous operation command is typically used, it is not necessary to wait for the response, and thus it is possible to suppress the deterioration of the operability.

As a result, it is possible to appropriately make the reliability and the operability of the remote operation balanced.

However, a series of processing described above can be executed by hardware, but also can be executed by software. When a series of processing is executed by software, a program constituting the software is installed on a computer with dedicated hardware or on a universal personal computer or the like that can execute various functions by various programs installed thereon from a recording medium.

Figure 19:
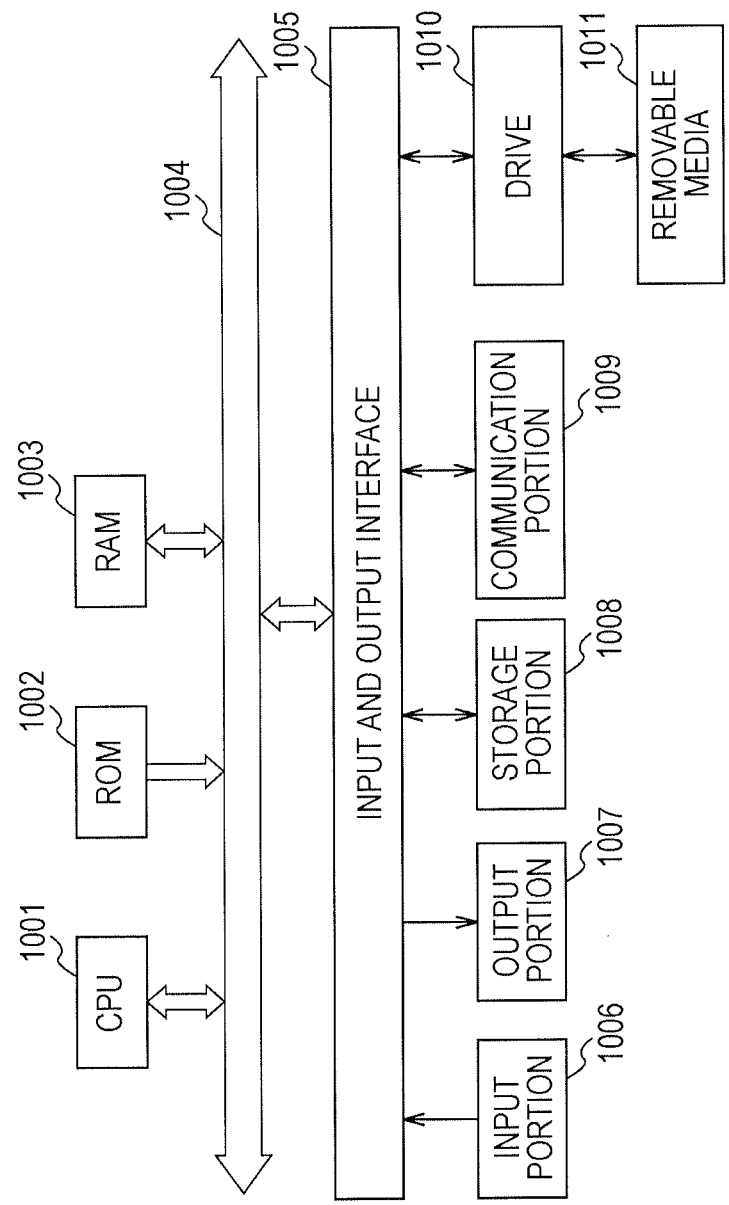
FIG. 19 is a view illustrating a configuration example of a universal personal computer.

FIG. 19 is a view illustrating a configuration example of a universal personal computer. The personal computer is embedded with a central processing unit (CPU) 1001. An input and output interface 1005 is connected to the CPU 1001 via a bus 1004. A read only memory (ROM) 1002 and a random access memory (RAM) 1003 are connected to the bus 1004.

An input portion 1006 which has an input device, such as a keyboard by which the user inputs the operation command or a mouse, an output portion 1007 which outputs a processing operation screen or the image of the processing result to a display device, a storage portion 1008 which has a hard disk drive that accommodates the program or various data, and a communication portion 1009 which has a local area network (LAN) adapter or the like and executes communication processing via a network represented by the Internet, are connected to the input and output interface 1005. In addition, a drive 1010 which reads and writes the data is connected to a removable media 1011, such as a magnetic disk (including a flexible disk), an optical disc (including a compact disc-read only memory (CD-ROM), and a digital versatile disc (DVD)), a magneto-optical disk (including a mini disc (MD)), or a semiconductor memory.

The CPU 1001 executes various types of processing according to a program stored in the ROM 1002 or a program that is read from the removable media 1011, such as the magnetic disk, the optical disk, the magneto-optical disk, or the semiconductor memory, installed in the storage portion 1008, and loaded into the RAM 1003 from the storage portion 1008. In the RAM 1003, necessary data or the like are also appropriately stored while the CPU 1001 executes various types of processing.

In the computer configured as above, for example, as the CPU 1001 loads the program stored in the storage portion 1008 to the RAM 1003 via the input and output interface 1005 and the bus 1004, and executes the program, a series of processing described above is performed.

The program executed by the computer (CPU 1001) can be provided to be stored in the removable media 1011 as package media, for example. In addition, the program can be provided via a wired or wireless transmission medium, such as a local area network, the Internet, or digital satellite broadcasting.

In the computer, by mounting the removable media 1011 to the drive 1010, the program can be installed in the storage portion 1008 via the input and output interface 1005. In addition, the program can be received by the communication portion 1009 via the wired or wireless transmission medium, and installed in the storage portion 1008. Alternatively, the program can be installed in the ROM 1002 or the storage portion 1008 in advance.

In addition, the program which is executed by the computer may be a program which performs the processing in time series in the order described in this specification, and may be a program which performs the processing in parallel or at a necessary timing when calling is performed.

In addition, in this specification, the system means an aggregation of a plurality of components (apparatus, module (part), or the like), and all of the components may or may not be in the same casing. Therefore, either a plurality of apparatuses which is accommodated in a separate casing and connected via the network or one apparatus which accommodates a plurality of modules in one casing is the system.

In addition, the embodiments of the disclosure are not limited to the above-described embodiments, and various modifications are possible without departing from the scope of the disclosure.

For example, the disclosure can have a configuration of a cloud computing which processes the dividing and sharing of one function in the plurality of apparatuses via the network.

In addition, each step described in the above-mentioned flow charts can be divided and executed in the plurality of apparatuses in addition to being executed in one apparatus.

Furthermore, when the plurality of processing is included in one step, the plurality of processing included in one step can be divided and executed in the plurality of apparatuses in addition to being executed at one apparatus.

In addition, the disclosure can also take a configuration as described below.

(A001) An information processing apparatus comprising: circuitry configured to transmit an input command to at least one of a plurality of imaging devices that are associated with the information processing apparatus, the command being executable as a synchronous operation or an asynchronous operation based on information relating to at least one of the imaging devices.

(A002) The information processing apparatus according to (A001), wherein the information is a number of the imaging devices to which the input command is transmitted.

(A003) The information processing apparatus according to (A002), wherein when the number of the imaging devices is below a threshold amount, the input command is transmitted as the synchronous operation, and when the number of the imaging devices is above the threshold amount, the input command is transmitted as the asynchronous operation.

(A004) The information processing apparatus according to (A001), wherein the information is a hop count for a wireless network communication with said at least one of the imaging devices to which the input command is transmitted.

(A005) The information processing apparatus according to (A001), wherein the information processing apparatus has an apparatus type, and the information is the apparatus type transmitting the input command to said at least one of the imaging devices.

(A006) The information processing apparatus according to (A001), wherein the information is an operation mode of said at least one of the imaging devices to which the input command is transmitted.

(A007) The information processing apparatus according to (A006), wherein when the operation mode is any of a high dynamic range mode, a super high-sensitivity mode, and a continuous imaging mode, the input command is transmitted as the asynchronous operation.

(A008) The information processing apparatus according to (A001), wherein the information is an amount of processing time expected to execute the input command.

(A009) The information processing apparatus according to claim 1, wherein the information is dependent upon a characteristic of a network wherein the information processing apparatus is wirelessly associated with the imaging devices.

(A010) The information processing apparatus according to (A009), wherein the characteristic comprises a number of the imaging devices wirelessly associated with the information processing apparatus, a hop count corresponding to at least one of the imaging devices in the network, and/or an apparatus type of the information processing apparatus.

(A011) The information processing apparatus according to (A001), wherein for the synchronous operation, when the input command is transmitted to said at least one of the imaging devices, a next input command is not transmitted to said at least one of the imaging devices until a completion notification is received regarding the input command.

(A012) The information processing apparatus according to (A001), wherein for the asynchronous operation, when the input command is transmitted to said at least one of the imaging devices, a next input command is transmitted to said at least one of the imaging devices in the absence of a confirmation that said at least one of the imaging devices has completed the input command.

(A013) A method for controlling an information processing apparatus, the method comprising: transmitting an input command to at least one of a plurality of imaging devices that are associated with the information processing apparatus, the command being executable as a synchronous operation or an asynchronous operation based on information relating to at least one of the imaging devices.

(A014) The method according to (A013), wherein the information is a number of the imaging devices to which the input command is transmitted.

(A015) The method according to (A014), wherein when the number of the imaging devices is below a threshold amount, the input command is transmitted as the synchronous operation, and when the number of the imaging devices is above the threshold amount, the input command is transmitted as the asynchronous operation.

(A016) The method according to (A013), wherein the information is a hop count for a wireless network communication with said at least one of the imaging devices to which the input command is transmitted.

(A017) A non-transitory computer readable medium storing program code for controlling an information processing apparatus, the program code being executable by a processor to perform operations comprising: transmitting an input command to at least one of a plurality of imaging devices that are associated with the information processing apparatus, the command being executable as a synchronous operation or an asynchronous operation based on information relating to at least one of the imaging devices.

(A018) The computer readable medium according to (A017), wherein the information is a number of the imaging devices to which the input command is transmitted.

(A019) The computer readable medium according to (A018), wherein when the number of the imaging devices is below a threshold amount, the input command is transmitted as the synchronous operation, and when the number of the imaging devices is above the threshold amount, the input command is transmitted as the asynchronous operation.

(A020) The computer readable medium according to (A017), wherein the information is a hop count for a wireless network communication with said at least one of the imaging devices to which the input command is transmitted.

(A021) An information processing apparatus comprising: circuitry configured to transmit a first command to at least one of a plurality of imaging devices, transmit a second command to at least one of the plurality of imaging devices after receiving a command response from the imaging device to which the first command is transmitted when the number of the plurality of imaging devices is smaller than a first value, and transmit the second command to at least one of the plurality of imaging devices regardless of receiving any command response from the imaging device to which the first command is transmitted when the number of the plurality of imaging devices is greater than the first value.

(A022) The information processing apparatus according to (A021), wherein the circuitry is configured to transmit the second command to at least one of the plurality of imaging devices in the absence of the command response from the imaging device to which the first command is transmitted when the number of the plurality of imaging devices is greater than the first value.

(A023) The information processing apparatus according to (A021), wherein the circuitry is configured to: transmit the second command with an information indicating that the second command is a synchronous command to at least one of the plurality of imaging devices after receiving a command response from the imaging device to which the first command is transmitted when the number of the plurality of imaging devices is smaller than a first value, and transmit the second command with an information indicating that the second command is an asynchronous command to at least one of the plurality of imaging devices regardless of receiving the command response from the imaging device to which the first command is transmitted when the number of the plurality of imaging devices is greater than the first value.

(A024) An imaging device connected to an information processing device, comprising: circuitry configured to transmit information regarding the imaging device, receive a command from an information processing apparatus, and determine whether to transmit a command response to the information processing apparatus based on whether the command is a synchronous command or an asynchronous command, wherein the command is determined as the synchronous command or the asynchronous command based on the information transmitted by the imaging device.

(B001). An information processing apparatus comprising: a communication portion configured to transmit an input command to at least one of a plurality of imaging devices that are wirelessly associated with the information processing apparatus, the commands being executable as a synchronous operation or an asynchronous operation; and control circuitry configured to transmit the input command to said at least one of the imaging devices under either the synchronous operation or the asynchronous operation depending upon information relating to the imaging devices.

(B002) The information processing apparatus according to (B001), wherein for the synchronous operation, when the input command is transmitted to said at least one of the imaging devices, a next input command is not transmitted to said at least one of the imaging devices until a completion notification is received regarding the input command.

(B003) The information processing apparatus according to (B002), wherein for the asynchronous operation, when the input command is transmitted to said at least one of the imaging devices, the next input command is transmitted to said at least one of the imaging devices in the absence of a confirmation that said at least one of the imaging devices has completed an execution of the input command.

(B004). An information processing apparatus comprising: a communication portion configured to transmit an input command to at least one of a plurality of imaging devices that are wirelessly associated with the information processing apparatus, the commands being executable as a first operation type or a second operation type; and control circuitry configured to transmit the input command to said at least one of the imaging devices under either the first operation type or the second operation type depending upon information relating to the imaging devices.

(B005) The information processing apparatus according to [B004), wherein for the first operation type, when the input command is transmitted to said at least one of the imaging devices, a next input command is not transmitted to said at least one of the imaging devices until a completion notification is received regarding the input command.

(B006) The information processing apparatus according to (B005), wherein for the second operation type, when the input command is transmitted to said at least one of the imaging devices, the next input command is transmitted to said at least one of the imaging devices in the absence of a confirmation that said at least one of the imaging devices has completed an execution of the input command.

(1) An information processing apparatus including: a control portion which determines whether a command input to a photographing apparatus is a synchronous operation command or an asynchronous operation command; and a communication portion which sends the command to the photographing apparatus as the synchronous operation command or the asynchronous operation command determined by the control portion.

(2) The information processing apparatus described in (1), further including a storage portion which registers information of the photographing apparatus as management information, in which the control portion determines whether the command is the synchronous operation command or the asynchronous operation command, based on information of the photographing apparatus registered in the management information.

(3) The information processing apparatus described in (2), in which the control portion determines whether the command is the synchronous operation command or the asynchronous operation command, based on information on the number of the photographing apparatuses registered in the management information.

(4) The information processing apparatus described in (2) or (3), in which the control portion determines that the command is the asynchronous operation command in a case where the number of the photographing apparatuses registered in the management information is greater than a predetermined number, and determines that the command is the synchronous operation command in other cases.

(5) The information processing apparatus described in (2), in which the control portion determines whether the command is the synchronous operation command or the asynchronous operation command, based on information on an operation mode of the photographing apparatus registered in the management information.

(6) The information processing apparatus described in (2) or (5), in which the control portion determines that the command is the asynchronous operation command in a case where the operation mode of the photographing apparatus registered in the management information is an operation mode of which a processing time related to photographing takes longer than a predetermined time, and determines that the command is the synchronous operation command in other cases.

(7) The information processing apparatus described in (2), (5), or (6), in which the control portion determines that the command is the asynchronous operation command in a case where the operation mode of the photographing apparatus registered in the management information is a continuous photographing mode, and determines that the command is the synchronous operation command in other cases.

(8) The information processing apparatus described in (2), (5), or (6), in which the control portion determines that the command is the asynchronous operation command in a case where the operation mode of the photographing apparatus registered in the management information is a long-time exposure mode, and determines that the command is the synchronous operation command in other cases.

(9) The information processing apparatus described in (2), in which the control portion determines whether the command is the synchronous operation command or the asynchronous operation command, based on information on the processing time in the photographing apparatus of the command to the photographing apparatus registered in the management information.

(10) The information processing apparatus described in (2) or (9), in which the control portion determines that the command is the asynchronous operation command in a case where the processing time in the photographing apparatus of the command to the photographing apparatus registered in the management information is longer than the predetermined time, and determines that the command is the synchronous operation command in other cases.

(11) The information processing apparatus described in (2), in which the control portion determines whether the command is the asynchronous operation command or the synchronous operation command, based on information on a hop count between the control portion itself in a topology structure and the photographing apparatus, of the photographing apparatus registered in the management information.

(12) The information processing apparatus described in (2) or (11), in which the control portion determines that the command is the asynchronous operation command in a case where the photographing apparatus registered in the management information includes the photographing apparatus of which the hop count between the control portion itself in the topology structure and the photographing apparatus is greater than the predetermined number, and determines that the command is the synchronous operation command in other cases.

(13) The information processing apparatus described in (1), in which the control portion determines whether the command is the asynchronous operation command or the synchronous operation command, based on whether the command is supplied by an operation of an operation button of the apparatus itself or the command is supplied from another apparatus.

(14) The information processing apparatus described in (1) or (13), in which the control portion determines that the command is the asynchronous operation command in a case where the command is supplied by the operation of the operation button of the apparatus itself, and determines that the command is the synchronous operation command in other cases.

(15) The information processing apparatus described in any one of (1) to (14), in which the communication portion simultaneously transmits the commands to the plurality of photographing apparatuses in a case where there are plural photographing apparatuses.

(16) An information processing method including determining whether a command input to a photographing apparatus is a synchronous operation command or an asynchronous operation command and sending the command to the photographing apparatus as the determined synchronous operation command or the asynchronous operation command.

(17) A program which causes a computer that controls an operation of an information processing apparatus to execute processing including: determining whether the command input to a photographing apparatus is a synchronous operation command or an asynchronous operation command; and sending the command to the photographing apparatus as the synchronous operation command or the asynchronous operation command determined by the processing in the control step.

(18) A photographing system including an information processing apparatus and a photographing apparatus, in which the information processing apparatus includes: a control portion which determines whether a command input to a photographing apparatus is a synchronous operation command or an asynchronous operation command; and a communication portion which sends the command to the photographing apparatus as the synchronous operation command or the asynchronous operation command determined by the control portion, and receives a completion notification of an operation executed by the command transmitted by the photographing apparatus, and in which the photographing apparatus includes: a reception portion which receives a command transmitted by the communication portion; an operation execution portion which executes an operation corresponding to the command; and a transmission portion which transmits the completion notification to the information processing apparatus when the operation executed by the operation execution portion is completed in a case where the command received by the reception portion is a synchronous operation command.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Photographing apparatus
21 Lens barrel
22-1, 22-2 Attaching member
23 Mounting surface
61 to 63 Operation member
64 Input and output portion
65 Voice output portion 66 Light-emitting portion
67 Photographing portion
111 Photographing portion
112 Image processing portion
113 Storage portion
114 Control portion
115 Wireless communication portion
121 NFC communication portion
122 Wi-Fi communication portion
123 Bluetooth communication portion
151 Posture detection portion
152 Operation reception portion
153 Wireless communication portion
154 Control portion
155 Image processing portion
156 Storage portion
181 NFC communication portion
182 Wi-Fi communication portion
183 Bluetooth communication portion

The invention claimed is:

1. An information processing apparatus comprising:
  circuitry configured to register a plurality of imaging devices as associated with the information processing apparatus simultaneously, and to transmit an input command to at least one of the plurality of imaging devices, the command being executable as a synchronous operation or an asynchronous operation based on information relating to at least one of the imaging devices,
  wherein the information is: a number of the imaging devices to which the input command is transmitted; a hop count for a wireless network communication with said at least one of the imaging devices to which the input command is transmitted; in a case where the information processing apparatus has an apparatus type, the apparatus type transmitting the input command to said at least one of the imaging devices; an operation mode of said at least one of the imaging devices to which the input command is transmitted; an amount of processing time expected to execute the input command; dependent upon a characteristic of a network wherein the information processing apparatus is wirelessly associated with the imaging devices; or combinations thereof.

2. The information processing apparatus according to claim 1, wherein the information is the number of the imaging devices to which the input command is transmitted.

3. The information processing apparatus according to claim 2, wherein when the number of the imaging devices is below a threshold amount, the input command is transmitted as the synchronous operation, and when the number of the imaging devices is above the threshold amount, the input command is transmitted as the asynchronous operation.

4. The information processing apparatus according to claim 1, wherein the information is the hop count for the wireless network communication with said at least one of the imaging devices to which the input command is transmitted.

5. The information processing apparatus according to claim 1, wherein the information processing apparatus has the apparatus type, and the information is the apparatus type transmitting the input command to said at least one of the imaging devices.

6. The information processing apparatus according to claim 1, wherein the information is the operation mode of said at least one of the imaging devices to which the input command is transmitted.

7. The information processing apparatus according to claim 6, wherein when the operation mode is any of a high dynamic range mode, a super high-sensitivity mode, and a continuous imaging mode, the input command is transmitted as the asynchronous operation.

8. The information processing apparatus according to claim 1, wherein the information is the amount of processing time expected to execute the input command.

9. The information processing apparatus according to claim 1, wherein the information is dependent upon the characteristic of the network wherein the information processing apparatus is wirelessly associated with the imaging devices.

10. The information processing apparatus according to claim 9, wherein the characteristic comprises a number of the imaging devices wirelessly associated with the information processing apparatus, a hop count corresponding to at least one of the imaging devices in the network, and/or an apparatus type of the information processing apparatus.

11. The information processing apparatus according to claim 1, wherein for the synchronous operation, when the input command is transmitted to said at least one of the imaging devices, a next input command is not transmitted to said at least one of the imaging devices until a completion notification is received regarding the input command.

12. The information processing apparatus according to claim 1, wherein for the asynchronous operation, when the input command is transmitted to said at least one of the imaging devices, a next input command is transmitted to said at least one of the imaging devices in the absence of a confirmation that said at least one of the imaging devices has completed the input command.

13. A method for controlling an information processing apparatus, the method comprising:
  registering a plurality of imaging devices as associated with the information processing apparatus simultaneously; and
  transmitting an input command to at least one of the plurality of imaging devices, the command being executable as a synchronous operation or an asynchronous operation based on information relating to at least one of the imaging devices,
  wherein the information is: a number of the imaging devices to which the input command is transmitted; a hop count for a wireless network communication with said at least one of the imaging devices to which the input command is transmitted; in a case where the information processing apparatus has an apparatus type, the apparatus type transmitting the input command to said at least one of the imaging devices; an operation mode of said at least one of the imaging devices to which the input command is transmitted; an amount of processing time expected to execute the input command; dependent upon a characteristic of a network wherein the information processing apparatus is wirelessly associated with the imaging devices; or combinations thereof.

14. The method according to claim 13, wherein the information is the number of the imaging devices to which the input command is transmitted.

15. The method according to claim 14, wherein when the number of the imaging devices is below a threshold amount, the input command is transmitted as the synchronous operation, and when the number of the imaging devices is above the threshold amount, the input command is transmitted as the asynchronous operation.

16. The method according to claim 13, wherein the information is a is the hop count for the wireless network communication with said at least one of the imaging devices to which the input command is transmitted.

17. An information processing apparatus comprising:
circuitry configured to
transmit a first command to at least one of a plurality of imaging devices,
transmit a second command to at least one of the plurality of imaging devices after receiving a command response from the imaging device to which the first command is transmitted when the number of the plurality of imaging devices is smaller than a first value, and
transmit the second command to at least one of the plurality of imaging devices regardless of receiving any command response from the imaging device to which the first command is transmitted when the number of the plurality of imaging devices is greater than the first value.

18. The information processing apparatus according to claim 17, wherein the circuitry is configured to
transmit the second command to at least one of the plurality of imaging devices in the absence of the command response from the imaging device to which the first command is transmitted when the number of the plurality of imaging devices is greater than the first value.

19. The information processing apparatus according to claim 17, wherein the circuitry is configured to:
transmit the second command with an information indicating that the second command is a synchronous command to at least one of the plurality of imaging devices after receiving a command response from the imaging device to which the first command is transmitted when the number of the plurality of imaging devices is smaller than a first value, and
transmit the second command with an information indicating that the second command is an asynchronous command to at least one of the plurality of imaging devices regardless of receiving the command response from the imaging device to which the first command is transmitted when the number of the plurality of imaging devices is greater than the first value.

20. An imaging device connected to an information processing apparatus, comprising:
first circuitry configured to transmit information regarding the imaging device, which is one of a plurality of imaging devices associated with the information processing apparatus,
second circuitry configured to receive a command from the information processing apparatus, and
third circuitry configured to determine whether to transmit a command response to the information processing apparatus based on whether the command is a synchronous command or an asynchronous command,
wherein the command is determined as the synchronous command or the asynchronous command based on the information transmitted by the imaging device.

21. An information processing apparatus comprising:
circuitry configured to transmit an input command to at least one of a plurality of imaging devices that are associated with the information processing apparatus, the command being executable as a synchronous operation or asynchronous operation based on information relating to at least one of the imaging devices,
wherein the information is a number of the imaging devices to which the input command is transmitted.

22. An information processing apparatus comprising:
circuitry configured to transmit an input command to at least one of a plurality of imaging devices that are associated with the information processing apparatus, the command being executable a synchronous operation or asynchronous operation based on information relating to at least one of the imaging devices,
wherein the information is an operation mode of said at least one of the imaging devices to which the input command is transmitted.

* * * * *